(12) United States Patent
Senoo et al.

(10) Patent No.: US 12,503,196 B2
(45) Date of Patent: Dec. 23, 2025

(54) BATTERY HOLDER FOR HUMAN-POWERED VEHICLE DRIVE UNIT, DRIVE UNIT FOR HUMAN-POWERED VEHICLE DRIVE UNIT, AND BATTERY UNIT FOR HUMAN-POWERED VEHICLE DRIVE UNIT

(71) Applicant: Shimano Inc., Osaka (JP)

(72) Inventors: Norihisa Senoo, Osaka (JP); Masahiro Kondo, Osaka (JP)

(73) Assignee: Shimano Inc., Osaka (JP)

( * ) Notice: Subject to any disclaimer, the term of this patent is extended or adjusted under 35 U.S.C. 154(b) by 203 days.

(21) Appl. No.: 17/376,609

(22) Filed: Jul. 15, 2021

(65) Prior Publication Data
US 2022/0033032 A1     Feb. 3, 2022

(30) Foreign Application Priority Data

Jul. 31, 2020   (JP) ................................. 2020-131251

(51) Int. Cl.
*B62M 6/90*   (2010.01)
*B62J 43/13*   (2020.01)
*B62J 43/28*   (2020.01)
*B62M 6/55*   (2010.01)

(52) U.S. Cl.
CPC ................ *B62M 6/90* (2013.01); *B62J 43/13* (2020.02); *B62J 43/28* (2020.02); *B62M 6/55* (2013.01)

(58) Field of Classification Search
CPC ... B62M 6/55; B62M 6/90; B62J 43/28; B62J 43/13; B62J 43/23; B62K 19/40; B62K 19/30; B62K 19/34
See application file for complete search history.

(56) References Cited

U.S. PATENT DOCUMENTS

| | | | |
|---|---|---|---|
| 6,646,547 B2 * | 11/2003 | Chiu ...................... | G08B 5/004 36/137 |
| 8,469,381 B2 * | 6/2013 | Dodman .................. | B62M 6/55 280/281.1 |
| 8,979,110 B2 * | 3/2015 | Talavasek ................ | B62M 6/60 280/279 |
| 9,580,141 B2 * | 2/2017 | Talavasek ................ | B62M 6/40 |
| 10,137,954 B2 * | 11/2018 | Hendey .................... | B62M 6/90 |
| 10,170,737 B2 * | 1/2019 | Shimoda ............. | H01M 50/202 |
| 10,183,591 B2 * | 1/2019 | Shieh ..................... | B62K 19/40 |
| 10,518,841 B2 * | 12/2019 | Talavasek .............. | B62K 19/18 |
| 10,868,288 B2 * | 12/2020 | Nishihara ................ | B62M 6/90 |

(Continued)

FOREIGN PATENT DOCUMENTS

| | | |
|---|---|---|
| CN | 201179950 Y | 1/2009 |
| CN | 204587213 U | 8/2015 |

(Continued)

*Primary Examiner* — Emma K Frick
(74) *Attorney, Agent, or Firm* — Global IP Counselors, LLP

(57) ABSTRACT

A battery holder is formed separately from a frame of a human-powered vehicle. The battery holder comprises a battery attachment portion and at least one drive unit connection portion. A battery unit is configured to be attached to the battery attachment portion by a threaded member in a removable manner. The at least one drive unit connection portion is configured to be connected to a drive unit that rotatably supports a crank axle of the human-powered vehicle.

22 Claims, 18 Drawing Sheets

(56) References Cited

U.S. PATENT DOCUMENTS

| | | | |
|---|---|---|---|
| 10,906,609 B2 * | 2/2021 | Talavasek | B62M 6/50 |
| 10,906,610 B2 * | 2/2021 | Talavasek | B62J 43/13 |
| 10,930,903 B2 * | 2/2021 | Mitsuyasu | B62M 6/90 |
| 10,994,620 B2 * | 5/2021 | Shieh | B62K 25/286 |
| 11,021,212 B2 * | 6/2021 | Shimoda | B62J 43/28 |
| 11,046,389 B2 * | 6/2021 | Talavasek | B62M 6/50 |
| 11,117,634 B2 * | 9/2021 | Talavasek | B62J 43/13 |
| 11,124,259 B2 * | 9/2021 | Talavasek | B62J 43/13 |
| 11,325,678 B2 * | 5/2022 | Wecker | B62K 19/40 |
| 11,345,437 B2 * | 5/2022 | Talavasek | B62J 43/28 |
| 11,565,769 B2 * | 1/2023 | Lechevallier | B62H 5/001 |
| 11,572,132 B2 * | 2/2023 | den Hertog | B62K 19/30 |
| 11,639,211 B2 * | 5/2023 | Farrell | B62K 19/40 180/68.5 |
| 11,654,990 B2 * | 5/2023 | Bass | B62J 6/045 280/288.4 |
| 11,667,348 B2 * | 6/2023 | Pallure | B62K 25/02 180/220 |
| 12,043,343 B2 * | 7/2024 | Bock | B60K 1/04 |
| 12,065,211 B2 * | 8/2024 | Farrell | B62J 43/28 |
| 2009/0140022 A1 | 6/2009 | Lin | |
| 2016/0194053 A1 | 7/2016 | Preining et al. | |
| 2016/0375954 A1 | 12/2016 | Talavasek et al. | |
| 2018/0029497 A1 | 2/2018 | Shieh | |
| 2018/0072380 A1 * | 3/2018 | Talavasek | B62K 25/28 |
| 2018/0269439 A1 * | 9/2018 | Yoneda | B62M 6/90 |
| 2019/0329660 A1 | 10/2019 | Shieh | |
| 2020/0062325 A1 | 2/2020 | Talavasek et al. | |
| 2020/0062339 A1 | 2/2020 | Talavasek et al. | |
| 2020/0247501 A1 * | 8/2020 | Kameda | B62J 43/28 |
| 2022/0242513 A1 * | 8/2022 | Kunert | B62J 9/30 |
| 2022/0266938 A1 * | 8/2022 | Kunert | B62M 6/90 |
| 2022/0289328 A1 * | 9/2022 | Philipzik | B62J 43/28 |
| 2022/0306240 A1 * | 9/2022 | Talavasek | B62J 45/423 |
| 2024/0262181 A1 * | 8/2024 | Spurlock | B62J 45/41 |

FOREIGN PATENT DOCUMENTS

| | | | | |
|---|---|---|---|---|
| DE | 10 2013 218 004 A1 | 3/2015 | | |
| EP | 1 752 373 A2 | 2/2007 | | |
| EP | 3 590 808 A1 | 1/2020 | | |
| JP | 3867836 B2 | 1/2007 | | |
| JP | 2018-6144 A | 1/2018 | | |
| TW | M524812 U | * | 7/2016 | B62M 6/90 |
| TW | M547522 U | 8/2017 | | |
| TW | M556231 U | 3/2018 | | |

* cited by examiner

BATTERY HOLDER FOR HUMAN-POWERED VEHICLE DRIVE UNIT, DRIVE UNIT FOR HUMAN-POWERED VEHICLE DRIVE UNIT, AND BATTERY UNIT FOR HUMAN-POWERED VEHICLE DRIVE UNIT

CROSS-REFERENCE TO RELATED APPLICATIONS

This application claims priority to Japanese Patent Application No. 2020-131251, filed on Jul. 31, 2020. The entire disclosure of Japanese Patent Application No. 2020-131251 is hereby incorporated herein by reference.

BACKGROUND

Technical Field

The present invention generally relates to a battery holder for a human-powered vehicle, a drive unit for a human-powered vehicle, and a battery unit for a human-powered vehicle.

Background Information

Some human-powered vehicles are provided with a battery unit. For example, Japanese Laid-Open Patent Publication No. 2018-6144 discloses a battery unit for a human-powered vehicle that is attached to a frame of the human-powered vehicle.

SUMMARY

One objective of the present disclosure is to provide a battery holder for a human-powered vehicle provided on a human-powered vehicle to allow a battery unit to be attached to the human-powered vehicle in a preferred manner, a drive unit for a human-powered vehicle provided on a human-powered vehicle to allow a battery unit to be attached to the human-powered vehicle in a preferred manner, and a battery unit for a human-powered vehicle that can be attached to a human-powered vehicle in a preferred manner.

A battery holder in accordance with a first aspect of the present disclosure is formed separately from a frame of a human-powered vehicle. The battery holder comprises a battery attachment portion and at least one drive unit connection portion. A battery unit is configured to be attached to the battery attachment portion by a threaded member in a removable manner. The at least one drive unit connection portion is configured to be connected to a drive unit that rotatably supports a crank axle of the human-powered vehicle. The battery holder according to the first aspect allows the battery unit to be attached to the battery attachment portion by the threaded member. The battery holder according to the first aspect that is provided on the human-powered vehicle allows the battery unit to be attached to the human-powered vehicle in a preferred manner.

In accordance with a second aspect of the present disclosure, the battery holder according to the first aspect is configured so that the battery attachment portion and the at least one drive unit connection portion are formed integrally with a housing of the drive unit. The battery holder according to the second aspect decreases the number of parts as compared with a case where the battery holder is formed separately from the housing of the drive unit.

In accordance with a third aspect of the present disclosure, the battery holder according to the first or second aspect further comprises at least one guide portion configured to guide the battery unit in a predetermined direction in a case where the battery unit is being attached to or being removed from the battery attachment portion. The battery holder according to the third aspect allows the battery unit to be guided by the at least one guide portion in the predetermined direction.

In accordance with a fourth aspect of the present disclosure, the battery holder according to any one of the first to third aspects is configured so that the threaded member includes at least one of a bolt and a nut. Further, the battery attachment portion includes at least one of an internal thread portion configured to be joined with the bolt, an external thread portion configured to be joined with the nut, and a through hole configured to allow passage of part of the bolt. The battery holder according to the fourth aspect allows the battery unit to be attached to the battery attachment portion by the threaded member and the at least one of the internal thread portion, the external thread portion, and the through hole.

In accordance with a fifth aspect of the present disclosure, the battery holder according to the third aspect is configured so that the threaded member includes at least one of a bolt and a nut. Further, the battery attachment portion includes at least one of an internal thread portion configured to be joined with the bolt, an external thread portion configured to be joined with the nut, and a through hole configured to allow passage of part of the bolt. The at least one of the internal thread portion, the external thread portion, and the through hole extends in a direction substantially parallel to the predetermined direction. The battery holder according to the fifth aspect allows the battery unit to be attached to the battery attachment portion by the threaded member and the at least one of the internal thread portion, the external thread portion, and the through hole extending substantially parallel to the predetermined direction.

In accordance with a sixth aspect of the present disclosure, the battery holder according to the third or fifth aspect is configured so that the predetermined direction is non-parallel to an axial direction of the crank axle in a state in which the at least one drive unit connection portion is connected to the drive unit. The battery holder according to the sixth aspect allows the battery unit to be guided by the at least one guide portion in the direction non-parallel to the axial direction of the crank axle.

In accordance with a seventh aspect of the present disclosure, the battery holder according to the sixth aspect is configured so that the predetermined direction is a direction extending substantially orthogonal to a direction parallel to the axial direction of the crank axle in a state in which the at least one drive unit connection portion is connected to the drive unit. The battery holder according to the seventh aspect allows the battery unit to be guided by the at least one guide portion in the direction extending substantially orthogonal to a direction parallel to the axial direction of the crank axle.

In accordance with an eighth aspect of the present disclosure, the battery holder according to any one of the third and fifth to seventh aspects is configured so that the battery attachment portion is configured so that the battery unit is attached with a longitudinal direction of the battery unit being substantially parallel to the predetermined direction. The battery holder according to the eighth aspect allows the battery unit to be attached to the battery attachment portion in a state in which the longitudinal direction of the battery unit is substantially parallel to the predetermined direction.

In accordance with a ninth aspect of the present disclosure, the battery holder according to any one of the third and fifth to eighth aspects is configured so that in a state in which the at least one drive unit connection portion is provided on the drive unit and the drive unit is provided on the human-powered vehicle, the predetermined direction is substantially parallel to a direction in which a downtube or a seat tube of the frame extends. The battery holder according to the ninth aspect allows the battery unit to be guided by the at least one guide portion in a direction substantially parallel to the direction in which the downtube or the seat tube of the frame extends in a state in which the at least one drive unit connection portion is provided on the drive unit, and the drive unit is provided on the human-powered vehicle.

A battery holder in accordance with a tenth aspect of the present disclosure is formed separately from a frame of a human-powered vehicle. The battery holder comprises a battery attachment portion and at least one guide portion. A battery unit is configured to be attached to the battery attachment portion by a threaded member in a removable manner. The at least one guide portion guides the battery unit in a predetermined direction in a case where the battery unit is being attached or being removed from the battery attachment portion. The battery holder according to the tenth aspect allows the battery unit to be attached to the battery attachment portion by the threaded member. Thus, the battery unit can be attached to the human-powered vehicle in a preferred manner. The battery holder according to the tenth aspect allows the battery unit to be guided by the at least one guide portion in the predetermined direction.

In accordance with an eleventh aspect of the present disclosure, the battery holder according to the tenth aspect is configured so that the threaded member includes at least one of a bolt and a nut. Further, the battery attachment portion includes at least one of an internal thread portion configured to be joined with the bolt, an external thread portion configured to be joined with the nut, and a through hole configured to allow passage of part of the bolt. The battery holder according to the eleventh aspect allows the battery unit to be attached to the battery attachment portion by the threaded member and the at least one of the internal thread portion, the external thread portion, and the through hole.

In accordance with a twelfth aspect of the present disclosure, the battery holder according to the eleventh aspect is configured so that the at least one of the internal thread portion, the external thread portion, and the through hole extends in the predetermined direction. The battery holder according to the twelfth aspect allows the battery unit to be attached to the battery attachment portion by the threaded member and the at least one of the internal thread portion, the external thread portion, and the through hole extending in the predetermined direction.

In accordance with a thirteenth aspect of the present disclosure, the battery holder according to any one of the third and fifth to twelfth aspects further comprises a restriction configured to restrict movement of the battery unit in a first direction of the predetermined direction in which the battery unit is being removed from the battery attachment portion. The battery holder according to the thirteenth aspect can restrict movement of the battery unit in the first direction with the restriction even in a case where the threaded member is removed.

A battery holder in accordance with a fourteenth aspect of the present disclosure is formed separately from a frame of a human-powered vehicle. The battery holder comprises at least one drive unit connection portion, at least one guide portion, and a restriction. The at least one drive unit connection portion is configured to be connected to a drive unit that rotatably supports a crank axle of the human-powered vehicle. The at least one guide portion guides a battery unit in a predetermined direction in a case where the battery unit is being attached or being removed from the battery attachment portion. The restriction is configured to restrict movement of the battery unit in a first direction of the predetermined direction in which the battery unit is being removed from the battery attachment portion. The restriction is located between the battery unit and the drive unit as viewed in a direction parallel to the crank axle in a state in which the battery unit is held by the battery holder and the drive unit is connected to the human-powered vehicle. The battery holder according to the fourteenth aspect restricts movement of the battery unit in the first direction with the restriction. The battery holder according to the fourteenth aspect allows the battery unit to be guided by the at least one guide portion in the predetermined direction. With the battery holder according to the fourteenth aspect, in a state in which the battery unit is held by the battery holder and the drive unit is connected to the human-powered vehicle, the restriction is located between the battery unit and the drive unit as viewed in a direction parallel to the crank axle. Thus, the restriction is arranged close to both the battery unit and the drive unit. The battery holder according to the fourteenth aspect that is provided on the human-powered vehicle allows the battery unit to be attached to the human-powered vehicle in a preferred manner.

In accordance with a fifteenth aspect of the present disclosure, the battery holder according to the thirteenth or fourteenth aspect is configured so that the restriction is configured to be movable between a first position where the restriction restricts movement of the battery unit and a second position where the restriction does not restrict movement of the battery unit. With the battery holder according to the fifteenth aspect, in a case where the restriction is moved from the first position to the second position, the battery unit can be moved relative to the restriction in the first direction.

In accordance with a sixteenth aspect of the present disclosure, the battery holder according to the fifteenth aspect further comprises an operating portion configured to operate the restriction. The operating portion includes a lever member rotated about a predetermined rotational axis. With the battery holder according to the sixteenth aspect, the restriction can be operated by the lever member rotated about the predetermined rotational axis.

In accordance with a seventeenth aspect of the present disclosure, the battery holder according to the sixteenth aspect is configured so that the operating portion is provided at a position where at least part of the operating portion is covered by an electric wiring unit that is electrically connected to the battery unit. With the battery holder according to the seventeenth aspect, the electric wiring unit reduces erroneous operations of the operating portion by a user.

In accordance with an eighteenth aspect of the present disclosure, the battery holder according to the seventeenth aspect is configured so that the predetermined rotational axis extends substantially perpendicular to the predetermined direction. The battery holder according to the eighteenth aspect allows the restriction to be operated by the lever member rotated about the predetermined rotational axis that extends substantially perpendicular to the predetermined direction.

In accordance with a nineteenth aspect of the present disclosure, the battery holder according to any one of the fifteenth to eighteenth aspects further comprises a biasing portion that biases the restriction from the second position toward the first position. The battery holder according to the nineteenth aspect can move the restriction from the second position to the first position with the biasing portion without moving the restriction from the second position to the first position with the operating portion.

In accordance with a twentieth aspect of the present disclosure, the battery holder according to any one of the fourteenth to nineteenth aspects further comprises a battery attachment portion that is configured to be attached to the battery unit in a removable manner. The battery holder according to the twentieth aspect allows the battery unit to be attached to the battery holder by the battery attachment portion in a preferred manner.

In accordance with a twenty-first aspect of the present disclosure, the battery holder according to the thirteenth or twentieth aspect is configured so that the battery attachment portion is provided at a downstream side of the restriction in the first direction. The battery holder according to the twenty-first aspect allows the battery unit to be held by the battery attachment portion at the downstream side of the restriction in the first direction.

In accordance with a twenty-second aspect of the present disclosure, the battery holder according to any one of the third, fifth to thirteenth, twentieth, and twenty-first aspects is configured so that the battery attachment portion is provided at a downstream side of the at least one guide portion in the first direction. The battery holder according to the twenty-second aspect allows the battery unit to be held by the battery attachment portion at the downstream side of the at least one guide portion in the first direction.

In accordance with a twenty-third aspect of the present disclosure, the battery holder according to any one of the first to ninth and fourteenth aspects is configured so that at least part of the battery attachment portion is located downward from the crank axle in a state in which the at least one drive unit connection portion is connected to the drive unit, the drive unit is connected to the frame, and each wheel of the human-powered vehicle is in contact with level ground. With the battery holder according to the twenty-third aspect, the center of mass of the human-powered vehicle can be lowered.

A drive unit in accordance with a twenty-fourth aspect of the present disclosure is for a human-powered vehicle. The drive unit comprises a base, a frame attaching portion, a motor, and a battery attaching portion. The base is configured to rotatably support a crank axle of the human-powered vehicle. The frame attaching portion is provided on the base and is attachable to a frame of the human-powered vehicle. The motor is provided on the base and is configured to apply propulsion force to the human-powered vehicle. The battery attachment portion is provided on the base, and a battery unit is attached to the battery attachment portion by a threaded member in a removable manner. The drive unit according to the twenty-fourth aspect allows the battery unit to be attached to the battery attachment portion by the threaded member in a removable manner. The drive unit according to the twenty-fourth aspect that is provided on the human-powered vehicle allows the battery unit to be attached to the human-powered vehicle in a preferred manner.

A battery unit in accordance with a twenty-fifth aspect of the present disclosure is for a human-powered vehicle. The battery unit comprises a housing and one or more battery cells. The housing defines an accommodation compartment and includes a first end and a second end in a longitudinal direction. The one or more battery cells are arranged in the accommodation compartment. The housing is configured to be attachable to and removable from the battery holder by a threaded member extending in a direction substantially parallel to the longitudinal direction. The battery unit according to the twenty-fifth aspect allows the housing to be attachable to and removable from the battery holder by the threaded member extending in a direction substantially parallel to the longitudinal direction. Thus, the battery unit can be attached to the human-powered vehicle in a preferred manner.

In accordance with a twenty-sixth aspect of the present disclosure, the battery unit according to the twenty-fifth aspect further comprises at least one guided portion provided on the housing and configured to be guided by at least one guide portion that is provided on the battery holder or a frame of the human-powered vehicle. The battery unit according to the twenty-sixth aspect can be guided in a preferred manner in a case where the at least one guided portion is guided by the at least one guide portion.

In accordance with a twenty-seventh aspect of the present disclosure, the battery unit according to the twenty-sixth aspect is configured so that the at least one guided portion extends in the longitudinal direction of the housing. The battery unit according to the twenty-sixth aspect can be appropriately guided in the longitudinal direction of the housing in a case where the at least one guided portion is guided by the at least one guide portion.

In accordance with a twenty-eighth aspect of the present disclosure, the battery unit according to any one of the twenty-fifth to twenty-seventh aspects is configured so that the threaded member includes at least one of a bolt and a nut. Further, the first end of the housing includes at least one of an internal thread portion configured to be joined with the bolt, an external thread portion configured to be joined with the nut, and a through hole configured to allow passage of part of the bolt. The battery unit according to the twenty-eighth aspect can be attached to the battery attachment portion by the at least one of the internal thread portion, the external thread portion, and the through hole.

In accordance with a twenty-ninth aspect of the present disclosure, the battery unit according to the twenty-eighth aspect is configured so that the first end includes a projected portion projecting in a direction non-parallel to the longitudinal direction of the housing. Further, the projected portion includes the at least one of the internal thread portion, the external thread portion, and the through hole. The battery unit according to the twenty-ninth aspect can be attached to the battery attachment portion by the at least one of the internal thread portion, the external thread portion, and the through hole of the projected portion.

In accordance with a thirtieth aspect of the present disclosure, the battery unit according to the twenty-sixth or twenty-seventh aspect is configured so that the threaded member includes at least one of a bolt and a nut. The first end of the housing includes at least one of an internal thread portion configured to be joined with the bolt, an external thread portion configured to be joined with the nut, and a through hole configured to allow passage of part of the bolt. The first end includes a projected portion projecting in a direction non-parallel to the longitudinal direction of the housing. The projected portion includes the at least one of the internal thread portion, the external thread portion, and the through hole. The at least one guided portion is provided on a side surface of the housing located between the projected portion and the second end. The battery unit according to the thirtieth aspect is guided by the at least one guided portion provided on the side surface located between the projected portion and the second end.

In accordance with a thirty-first aspect of the present disclosure, the battery unit according to the thirtieth aspect is configured so that the projected portion and the at least one guided portion are provided on a first side surface of the housing that is located toward one side of a direction substantially orthogonal to the longitudinal direction. The battery unit according to the thirty-first aspect allows the projected portion to be arranged in the proximity of the at least one guided portion.

In accordance with a thirty-second aspect of the present disclosure, the battery unit according to any one of the twenty-eighth to thirty-first aspects further comprises an engagement portion configured to be engaged with a restriction provided on the battery holder to restrict movement of the battery unit in a removing direction. The battery unit according to the thirty-second aspect can restrict removal of the battery unit from the battery holder in a case where the engagement portion is engaged with the restriction.

In accordance with a thirty-third aspect of the present disclosure, the battery unit according to the thirty-first aspect further comprises an engagement portion configured to be engaged with a restriction provided on the battery holder to restrict movement of the battery unit in a removing direction. The engagement portion is provided on the first side surface. The battery unit according to the thirty-third aspect restricts removal of the battery unit from the battery holder in a case where the restriction is engaged with the engagement portion provided on the first side surface.

In accordance with a thirty-fourth aspect of the present disclosure, the battery unit according to the thirty-second or thirty-third aspect is configured so that the engagement portion includes a pit. With the battery unit according to the thirty-fourth aspect, the engagement portion can be easily configured by the pit.

The battery holder for a human-powered vehicle and the drive unit for a human-powered vehicle in accordance with the present disclosure allow the battery unit to be attached to the human-powered vehicle in a preferred manner. The battery unit for a human-powered vehicle in accordance with the present disclosure can be attached to the human-powered vehicle in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
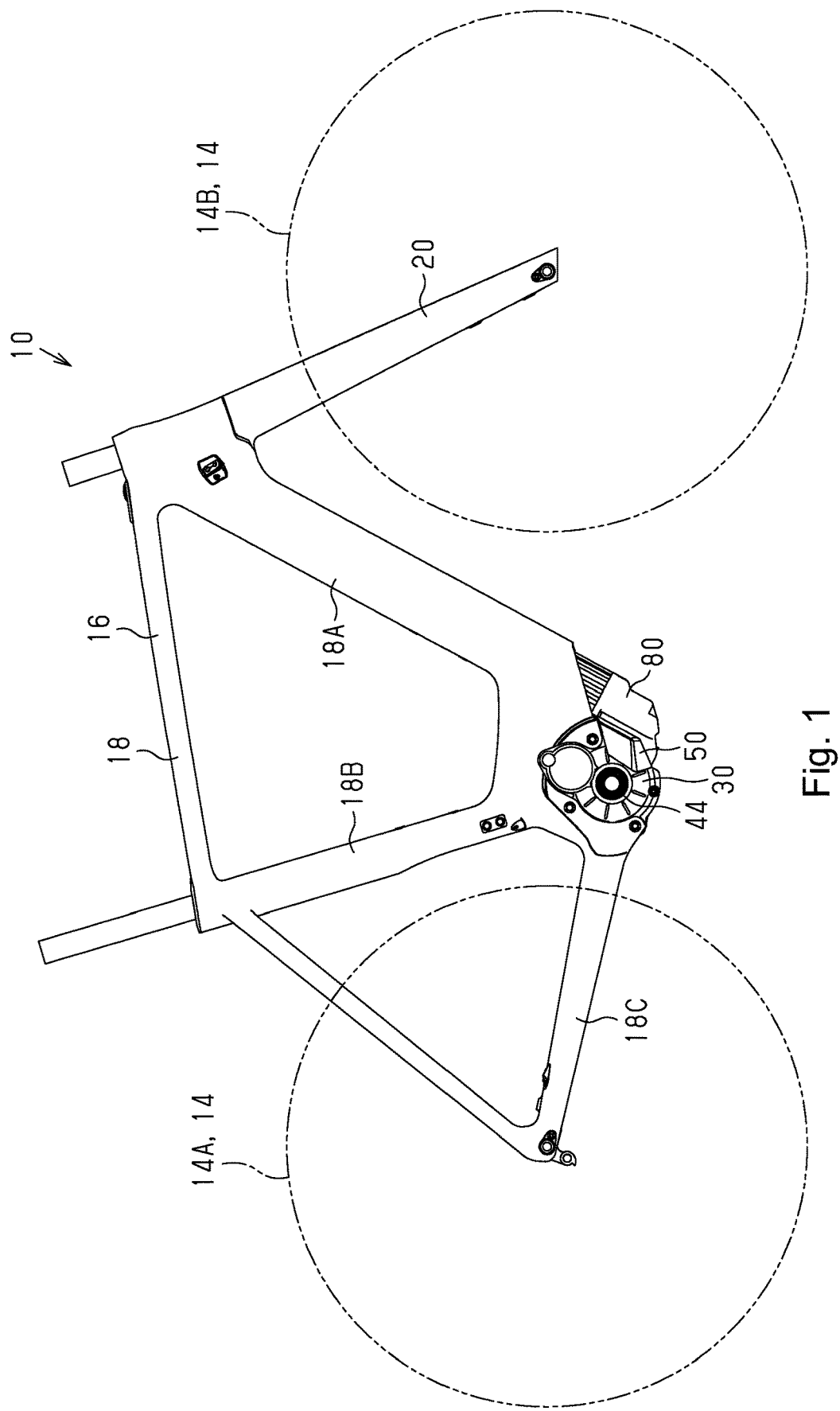
FIG. 1 is a side elevational view showing a main body of a human-powered vehicle (e.g., a bicycle) taken from a first side, the human-powered vehicle including a battery holder for the human-powered vehicle, a drive unit for the human-powered vehicle, and a battery unit for the human-powered vehicle in accordance with an embodiment.
Figure 2:
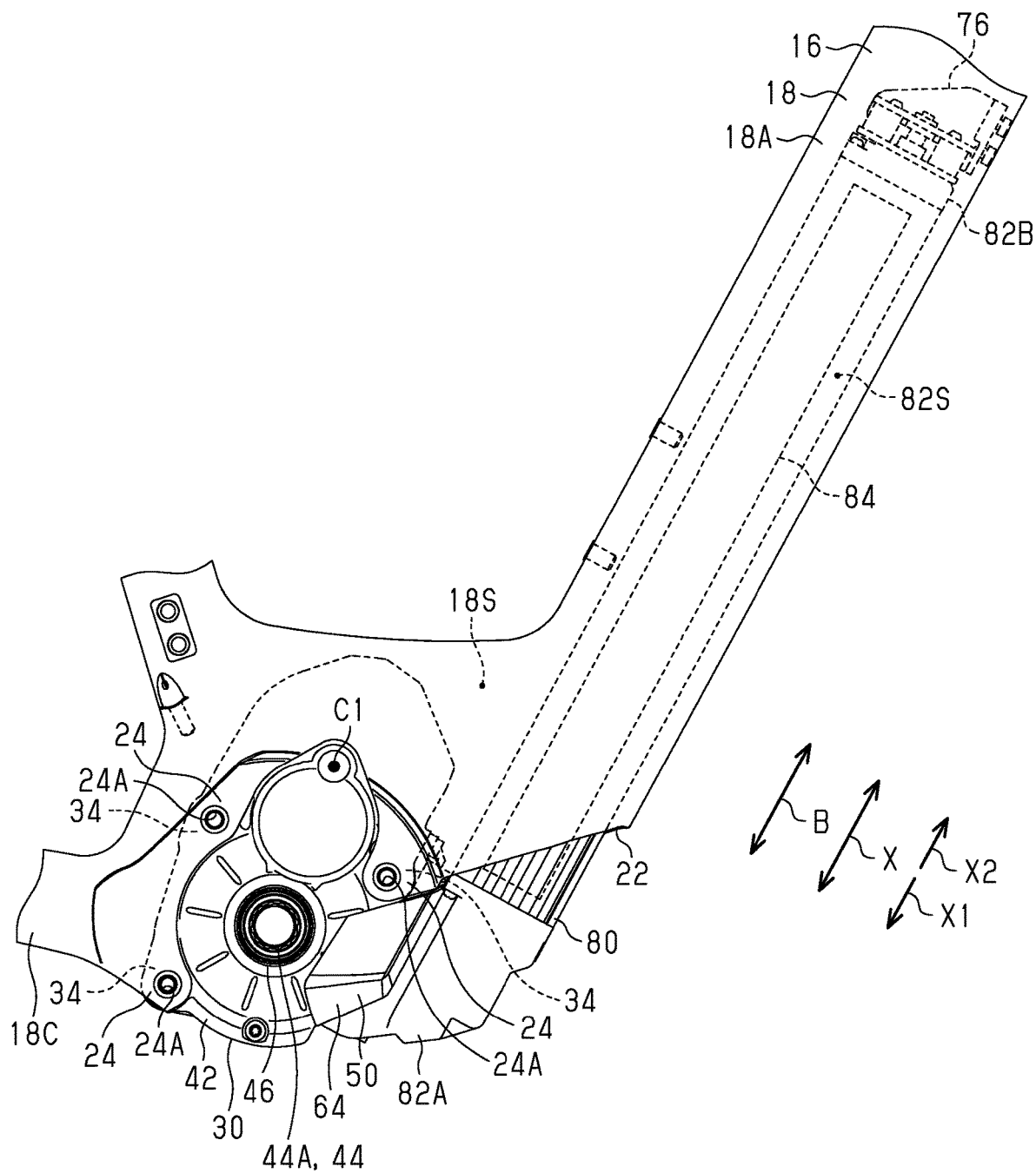
FIG. 2 is a side elevational view of a portion of the human-powered vehicle taken from the first side showing the structure of the battery holder, the drive unit, and battery unit that are in the main body of the human-powered vehicle shown in FIG. 1.
Figure 3:
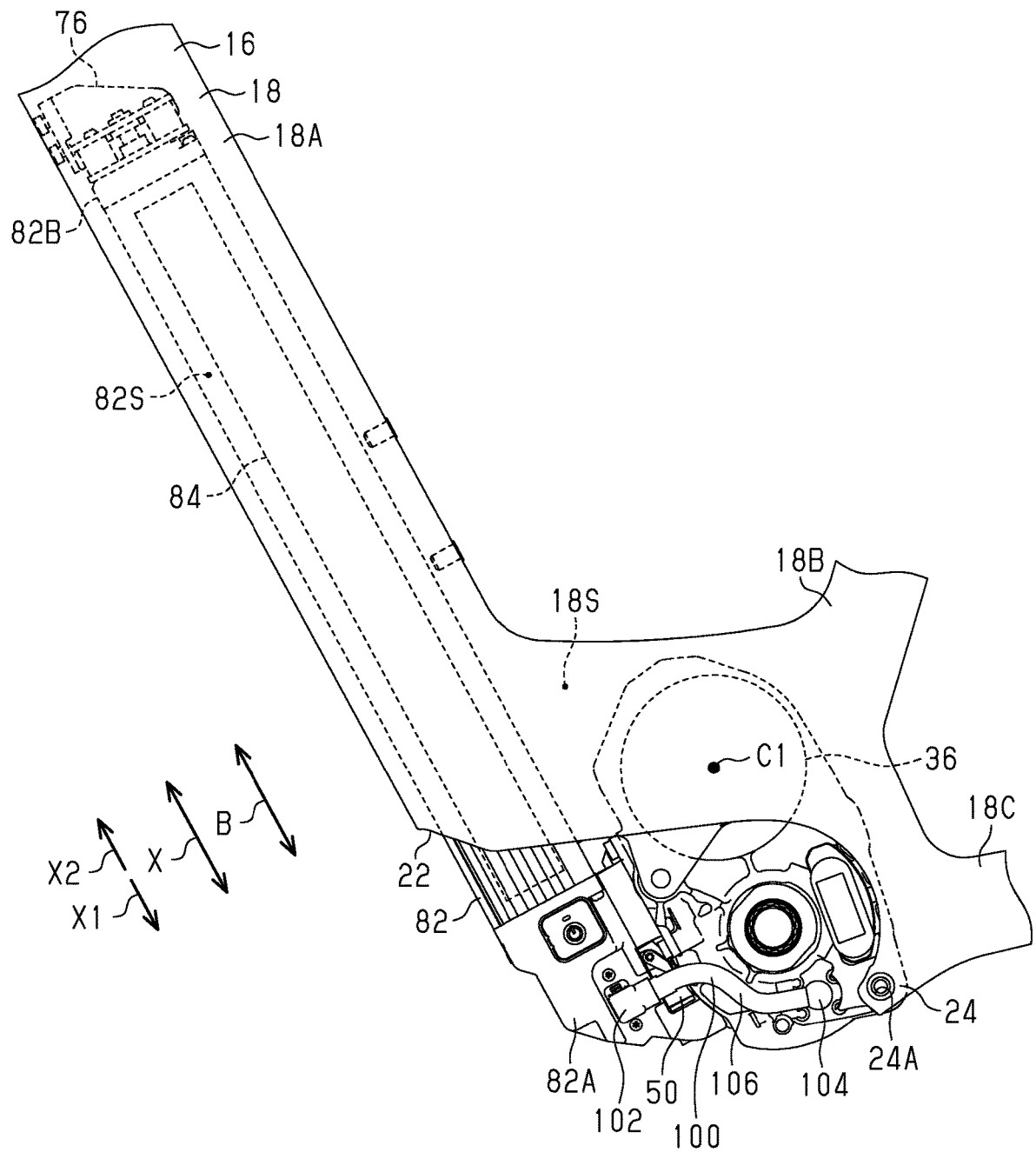
FIG. 3 is a side elevational view of a portion of the human-powered vehicle taken from a second side showing the structure of the battery holder, the drive unit, and battery unit that are in the main body of the human-powered vehicle shown in FIG. 1.
Figure 4:
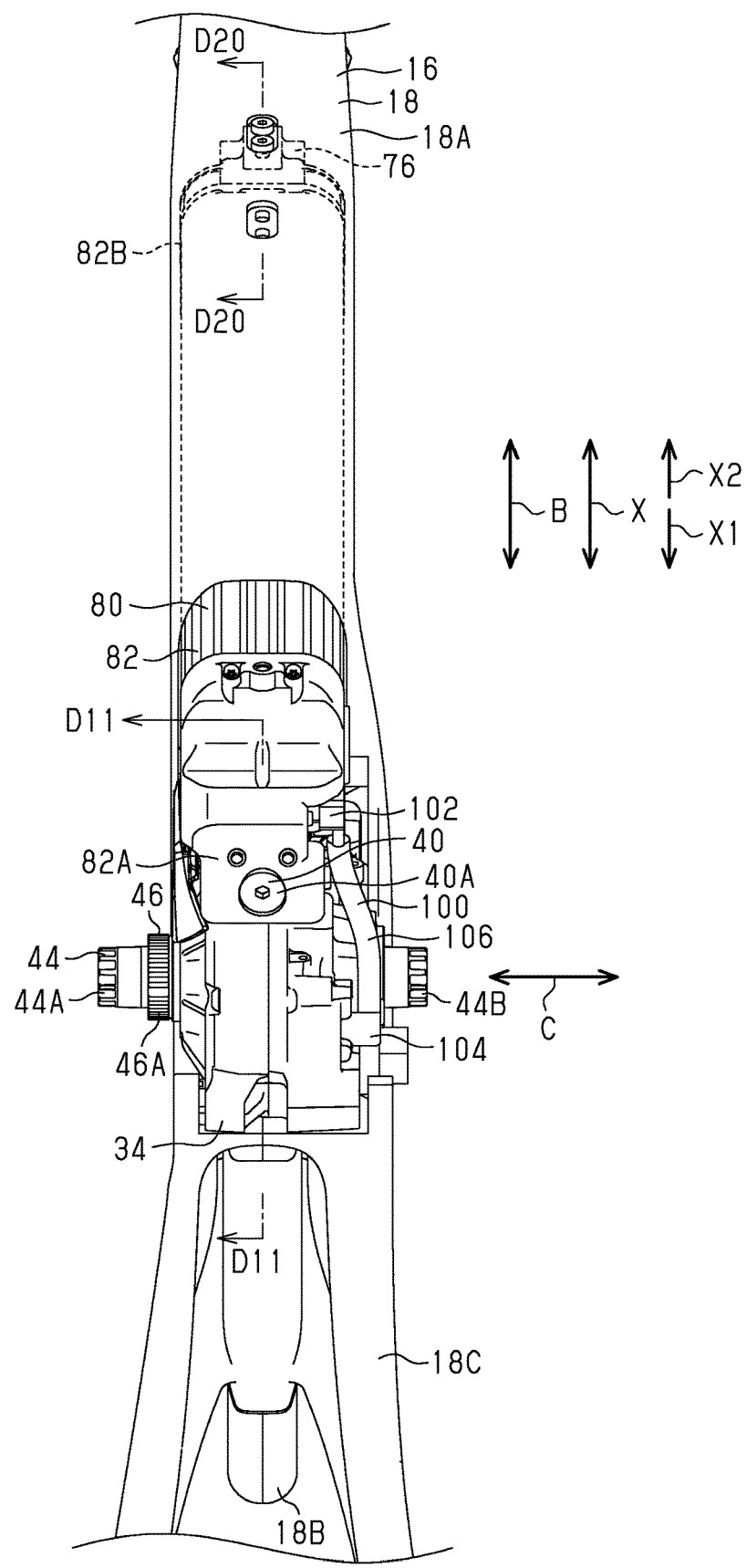
FIG. 4 is a bottom view of a portion of the human-powered vehicle showing the structure of the battery holder, the drive unit, and battery unit that are in the main body of the human-powered vehicle shown in FIG. 1.
Figure 5:
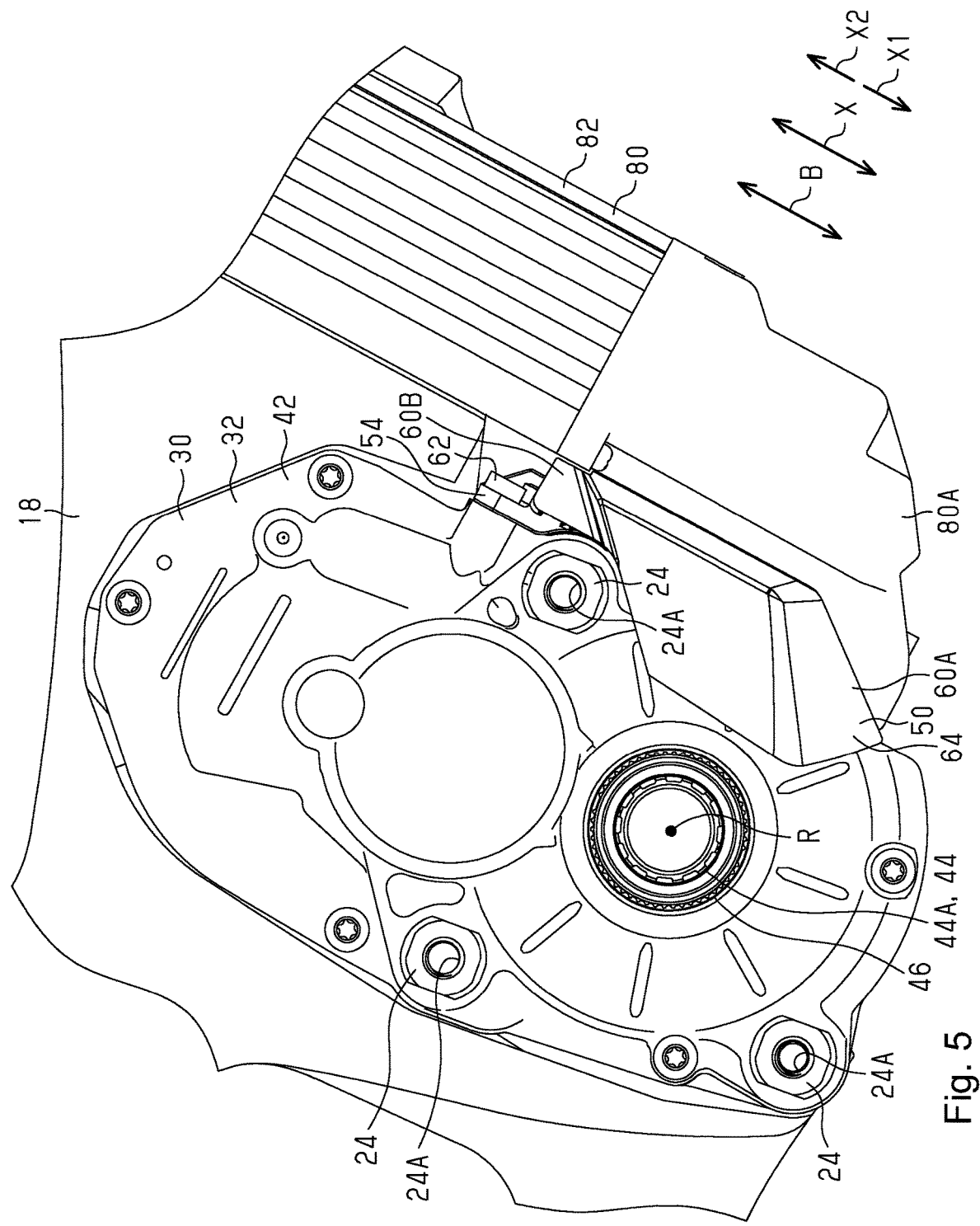
FIG. 5 is an enlarged side elevational view of the battery holder, in which part of a frame shown in FIG. 2 is omitted.
Figure 6:
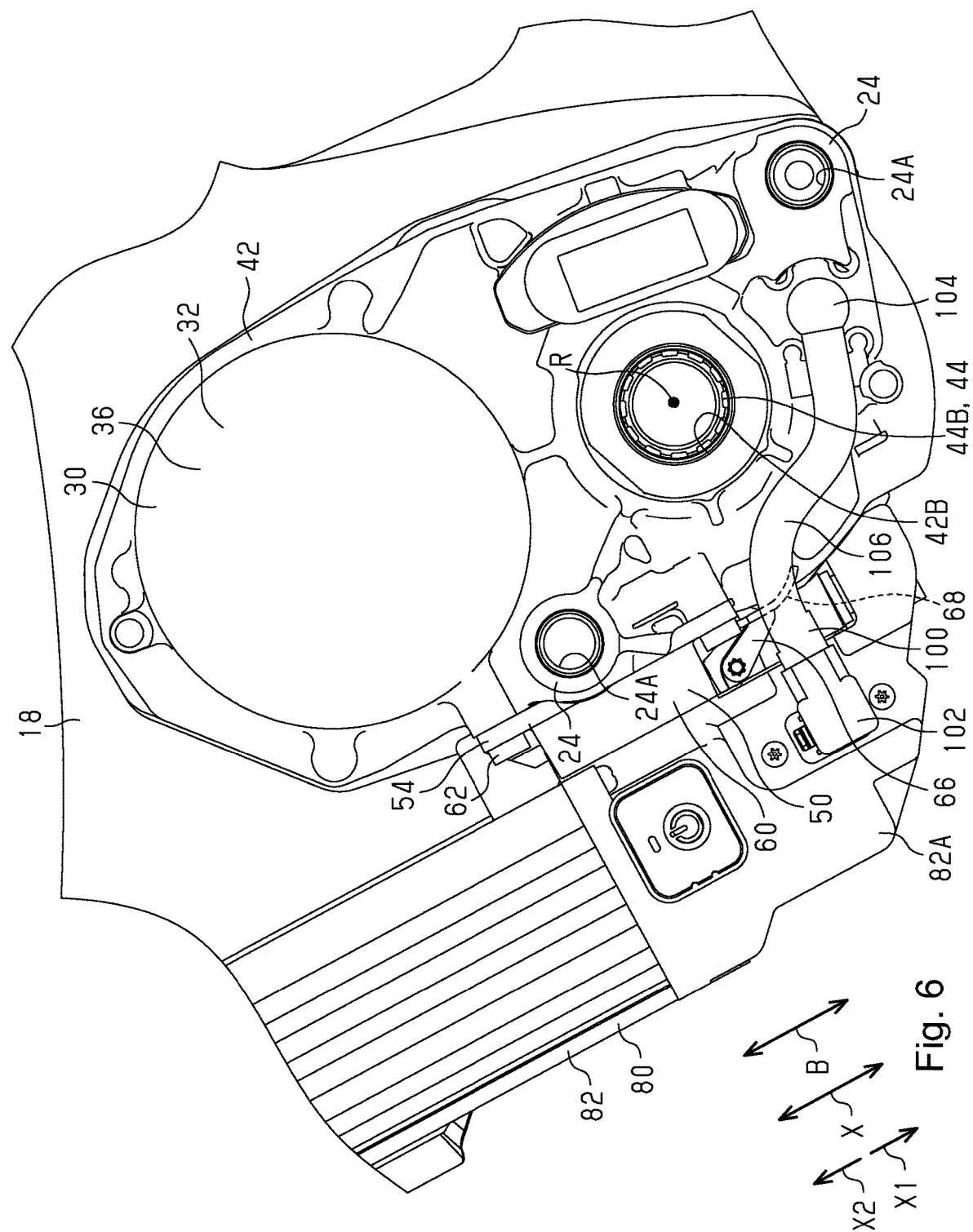
FIG. 6 is an enlarged side elevational view of the battery holder, in which part of the frame shown in FIG. 3 is omitted.
Figure 7:
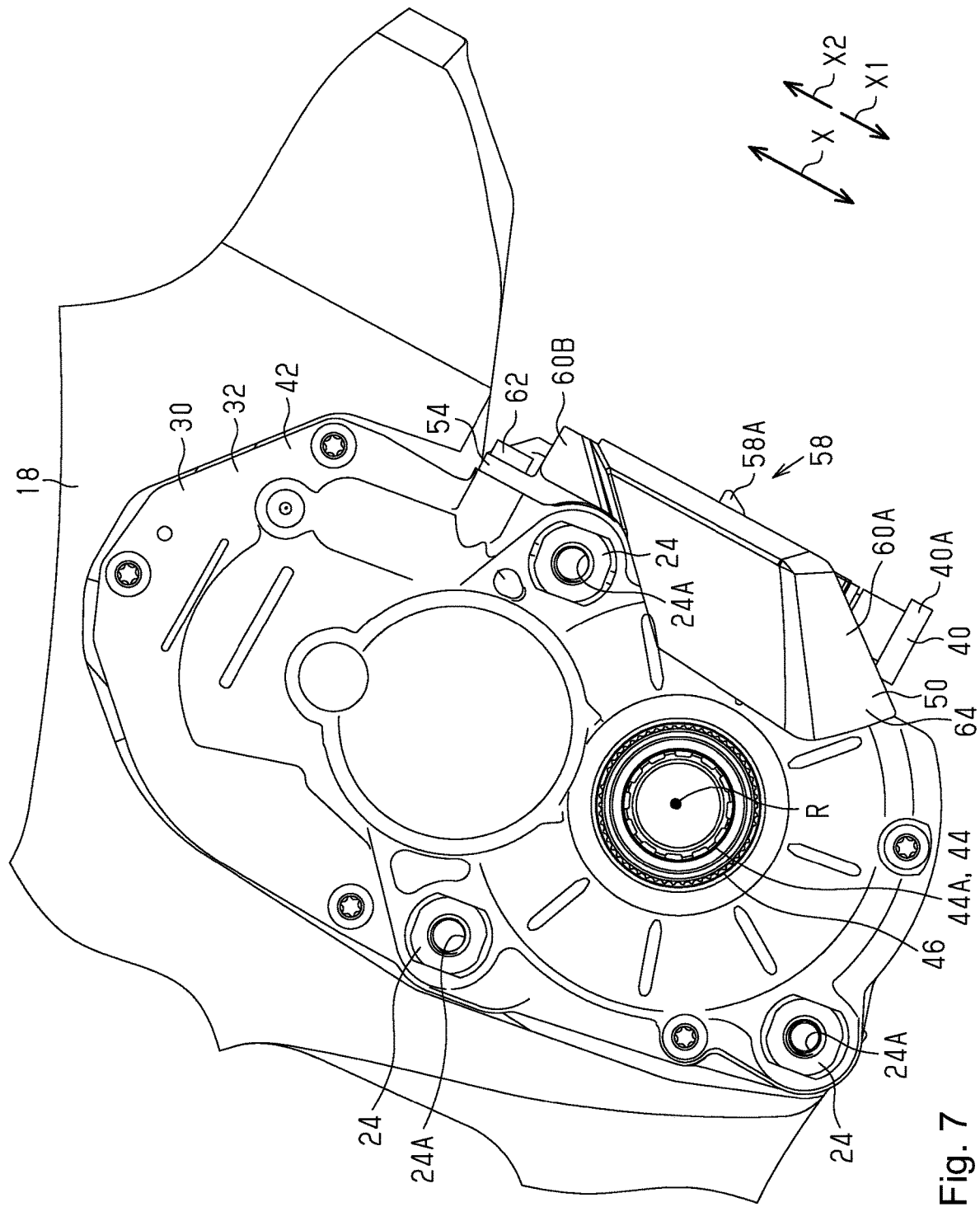
FIG. 7 is a side elevational view of the battery holder, in which the battery unit shown in FIG. 5 is omitted.
Figure 8:
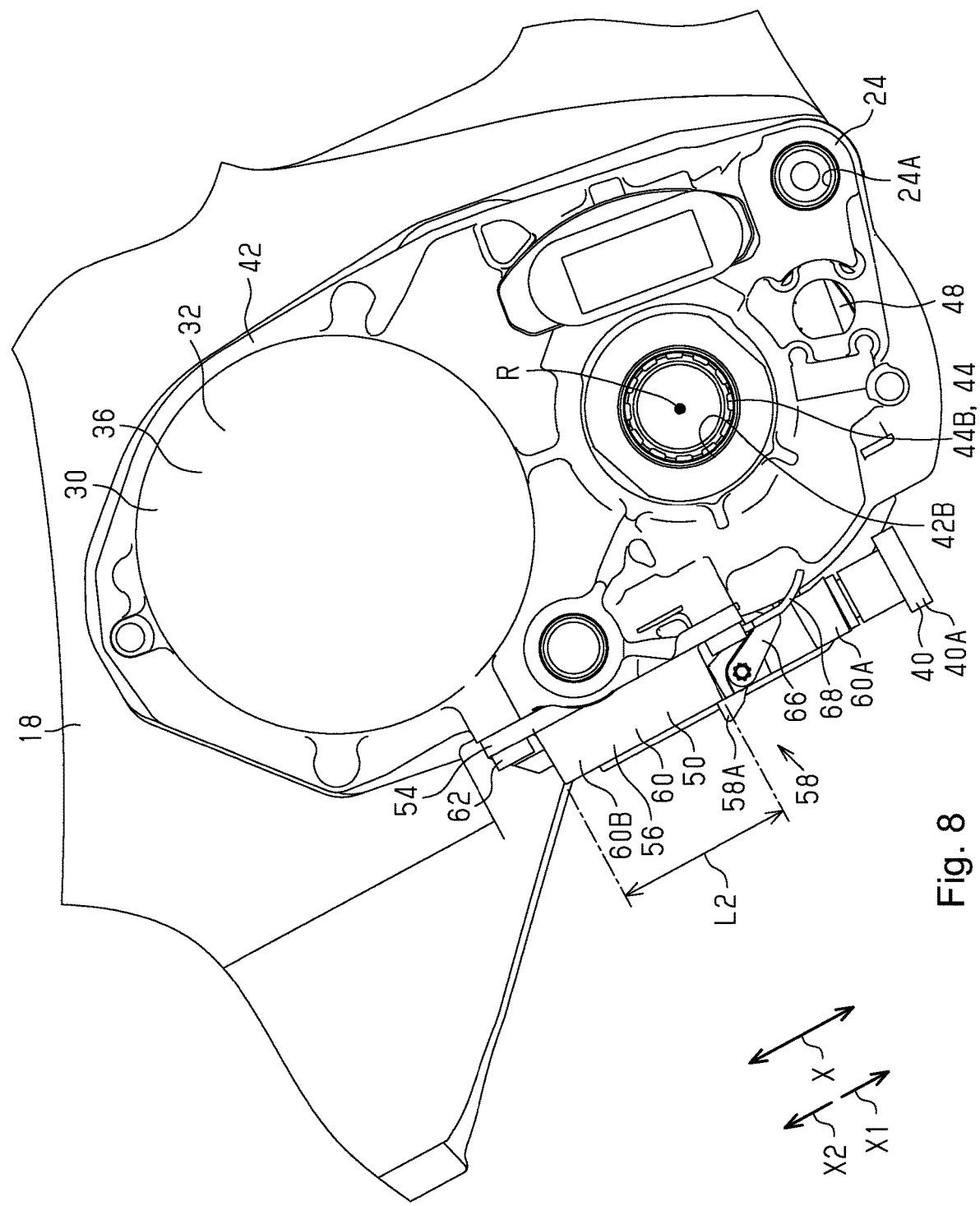
FIG. 8 is a side elevational view of the battery holder, in which the battery unit shown in FIG. 6 is omitted.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle battery holder 50, a human-powered vehicle drive unit 30, and a human-powered vehicle battery unit 80 in accordance with an embodiment will now be described with reference to FIGS. 1 to 20. A human-powered vehicle 10 is a vehicle that includes at least one wheel and can be driven by at least human driving force. Examples of the human-powered vehicle 10 include various types of bicycles such as a mountain bike, a road bike, a city bike, a cargo bike, a handcycle, and a recumbent bike. There is no limit to the number of wheels of the human-powered vehicle 10. The human-powered vehicle 10 also includes, for example, a unicycle or a vehicle having three or more wheels. The human-powered vehicle 10 is not limited to a vehicle that can be driven only by human driving force. The human-powered vehicle 10 includes an electric bicycle (E-bike) that uses drive force of an electric motor for propulsion in addition to human driving force. The E-bike includes an electric assist bicycle that assists propulsion with an electric motor. In the embodiment described hereafter, the human-powered vehicle 10 will be described as an electric assist bicycle, and an example of the electric assist bicycle is a road bike.

The human-powered vehicle 10 includes an input rotational shaft to which human driving force is input. The human-powered vehicle 10 further includes a wheel 14 and a vehicle body 16. The wheel 14 includes a rear wheel 14A and a front wheel 14B. The vehicle body 16 includes a frame 18. The input rotational shaft includes a crank axle 44 that is rotatable relative to the frame 18. The crank axle 44 includes two crank arms. One crank arm is provided on one axial end of the crank axle 44, and the other crank arm is provided on the other axial end of crank axle 44. The two crank arms and the crank axle 44 form a crank. Two pedals are coupled to the two crank arms, respectively. The rear wheel 14A is driven by the rotation of the crank. The rear wheel 14A is supported by the frame 18. The crank is connected to the rear wheel 14A by a drive mechanism. The drive mechanism includes a first rotational body connected to the crank axle 44. The crank axle 44 and the first rotational body can be coupled to rotate integrally with each other or coupled by a first one-way clutch. The first one-way clutch is configured to rotate the first rotational body forward in a case where the crank is rotated forward and configured to allow relative rotation of the crank and the first rotational body in a case where the crank is rotated rearward. In the present embodiment, the crank axle 44 is coupled to the first rotational body in an integrally rotatable manner. The first rotational body includes a sprocket, a pulley, or a bevel gear. The drive mechanism further includes a second rotational body and a linking member. The linking member transmits the rotational force of the first rotational body to the second rotational body. The linking member includes, for example, a chain, a belt, or a shaft.

The second rotational body is connected to the rear wheel 14A. The second rotational body includes a sprocket, a pulley, or a bevel gear. Preferably, a second one-way clutch is provided between the second rotational body and the rear wheel 14A. The second one-way clutch is configured to rotate the rear wheel 14A forward in a case where the second rotational body is rotated forward and allow relative rotation of the second rotational body and the rear wheel 14A in a case where the second rotational body is rotated rearward.

The front wheel 14B is attached to the frame 18 by a front fork 20. A handlebar is connected to the front fork 20 by a stem. In the present embodiment, the rear wheel 14A is connected to the crank by the drive mechanism. Alternatively, at least one of the rear wheel 14A and the front wheel 14B can be connected to the crank by the drive mechanism.

The human-powered vehicle 10 includes the drive unit 30, the battery holder 50, and the battery unit 80. Preferably, the drive unit 30 includes a base 32, a frame attaching portion 34, and a motor 36. The base 32 rotatably supports the crank axle 44 of the human-powered vehicle 10. The frame attaching portion 34 is provided on the base 32, and is attachable to the frame 18 of the human-powered vehicle 10. The motor 36 is provided on the base 32, and is configured to apply a propulsion force to the human-powered vehicle 10. The motor 36 includes an electric motor. Preferably, the drive unit 30 further includes the crank axle 44. Preferably, the drive unit 30 further includes an output portion 46.

Preferably, the base 32 includes a housing 42. The motor 36 is provided on the housing 42. In the present embodiment, the motor 36 is provided on the housing 42 so that a rotational axis C1 of the motor 36 is substantially parallel to a rotational axis R of the crank axle 44. The motor 36 can be provided on the housing 42 so that the rotational axis C1 of the motor 36 is non-parallel to the rotational axis R of the crank axle 44. The motor 36 can be at least partially accommodated in the inner space of the housing 42. Alternatively, the motor 36 can be formed separately from the housing 42 and coupled to the housing 42. Preferably, the motor 36 is provided on the housing 42 so that the rotational center axis is parallel to an axial direction C of the crank axle 44. Preferably, the inner space of the housing 42 accommodates at least part of a speed reducer provided in a power transmission path extending between the motor 36 and the first rotational body.

The housing 42 includes a first hole 42A and a second hole 42B in which the crank axle 44 is located. The crank axle 44 includes a first end 44A that is partially arranged in the first hole 42A. The crank axle 44 includes a second end 44B that is partially arranged in the second hole 42B. Preferably, the output portion 46 is provided in the vicinity of the crank axle 44. In the present embodiment, the output portion 46 is cylindrical and provided coaxially with the crank axle 44. The rotational force of the crank axle 44 and the rotational force of the motor 36 are transmitted to the output portion 46. The output portion 46 is at least partially arranged in the first hole 42A. The output portion 46 includes a first rotational body coupling portion 46A to which the first rotational body is coupled. The first rotational body coupling portion 46A includes, for example, splines. The first one-way clutch can be provided in the power transmission path between the crank axle 44 and the output portion 46.

The drive unit 30 is at least partially arranged in an interior space 18S of the frame 18. The frame 18 includes an opening 22 that is connected to the interior space 18S. Preferably, the opening 22 is provided in at least one of a downtube 18A and a seat tube 18B of the frame 18. In the present embodiment, the opening 22 is provided in a connection portion connecting the downtube 18A, the seat tube 18B, and a chain stay 18C. Preferably, the opening 22 is directed downward in a state in which each of the wheels 14 of the human-powered vehicle 10 is in contact with level ground.

Figure 9:
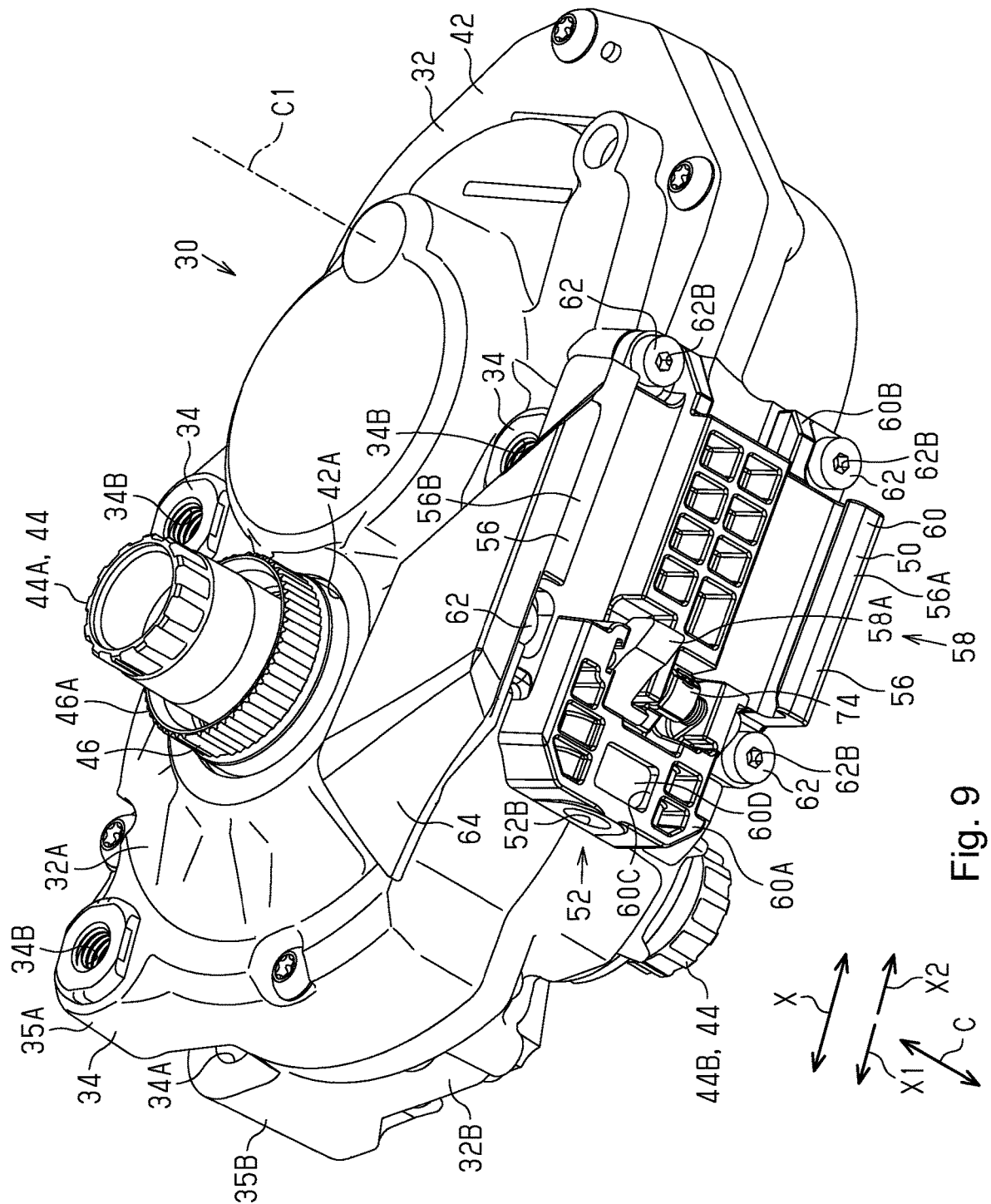
FIG. 9 is a perspective view of the battery holder shown in FIG. 2 and the drive unit shown in FIG. 2.
Figure 10:
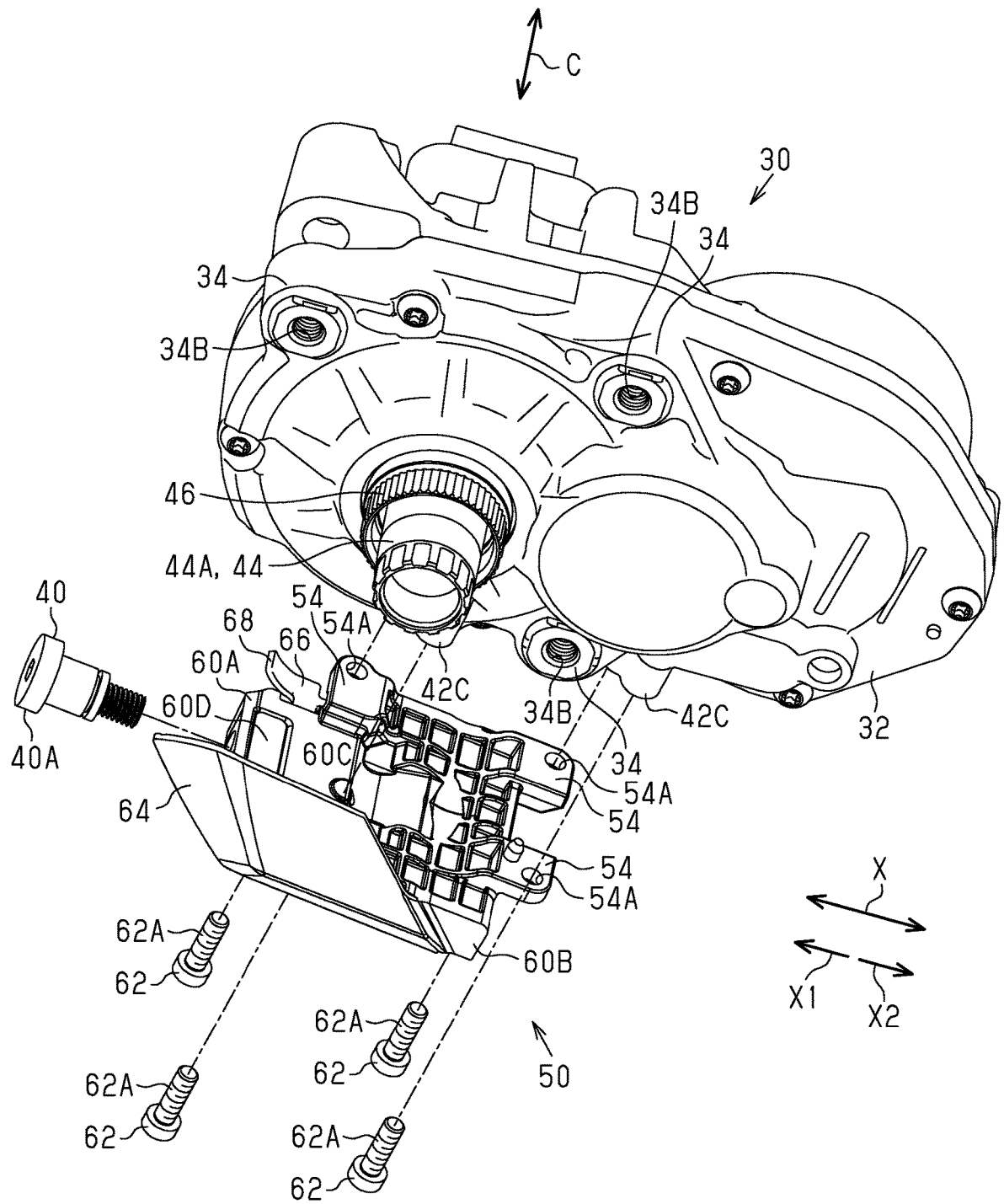
FIG. 10 is an exploded perspective view of the battery holder shown in FIG. 9 and the drive unit shown in FIG. 9.
Figure 11:
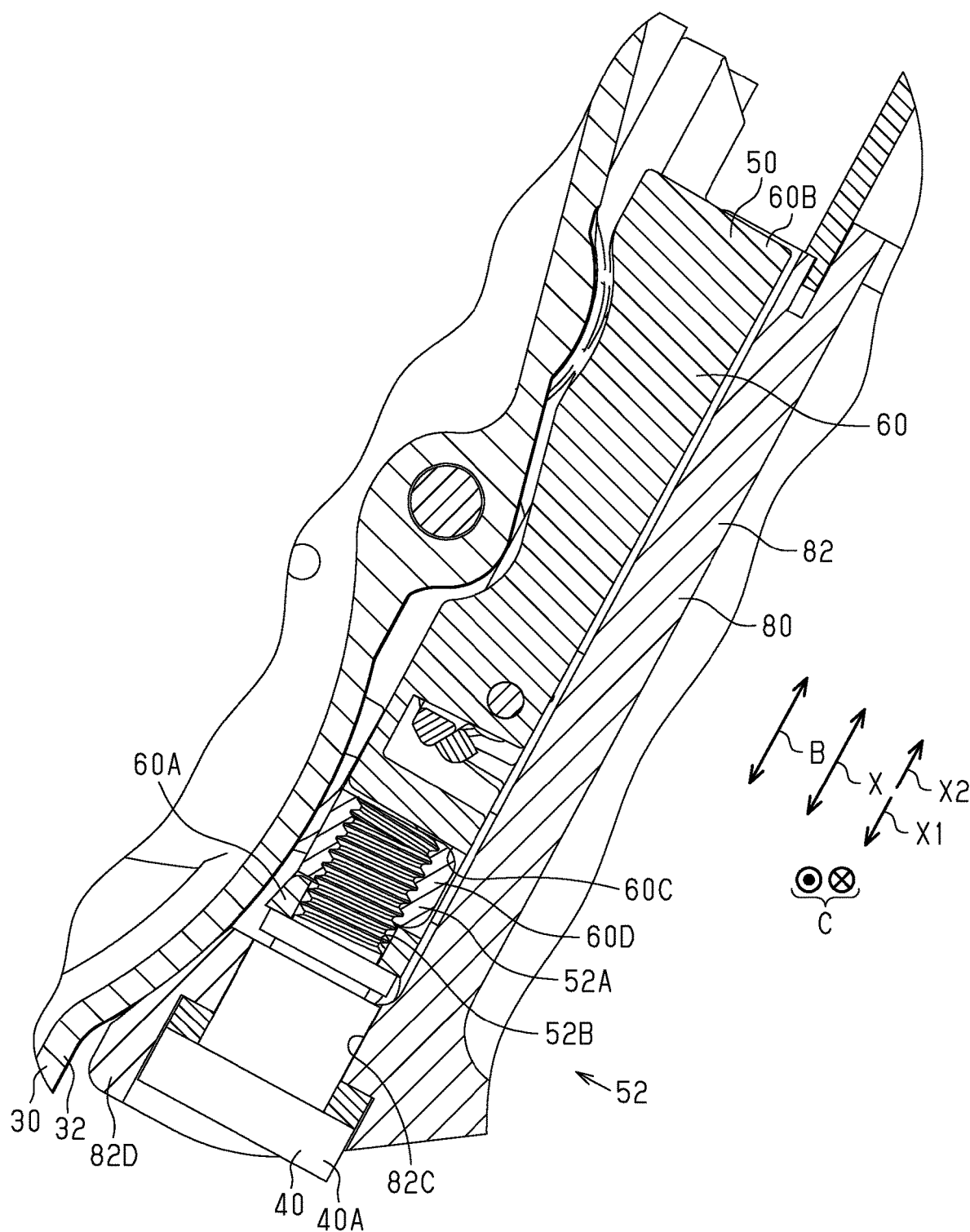
FIG. 11 is a partially cross-sectional view of a portion of the battery holder taken along section line D11-D11 shown in FIG. 4.
Figure 12:
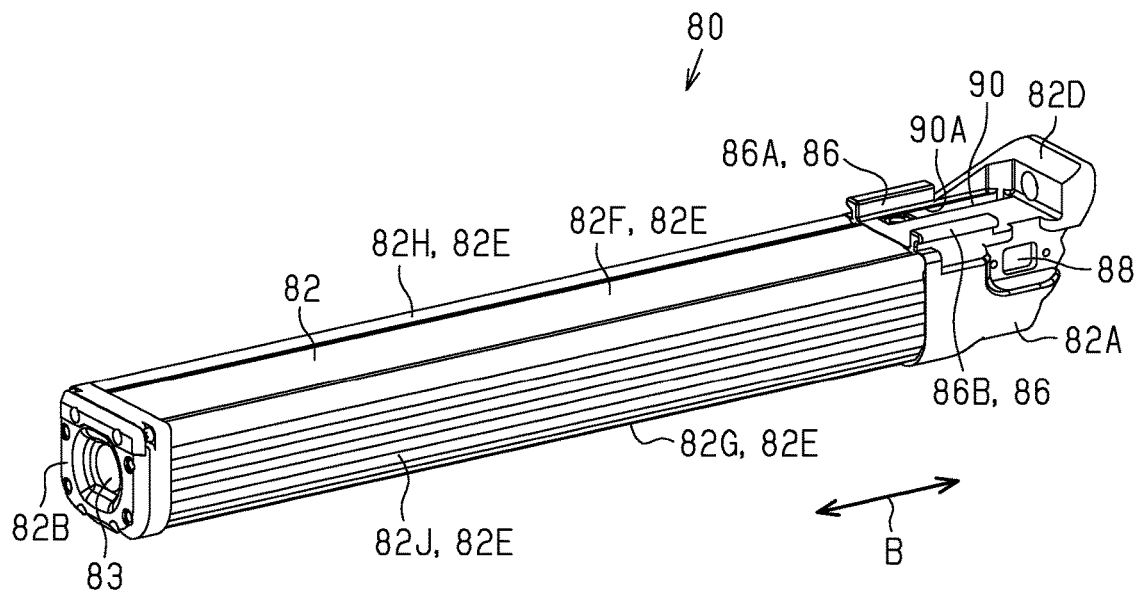
FIG. 12 is a perspective view of the battery unit shown in FIG. 1.
Figure 13:
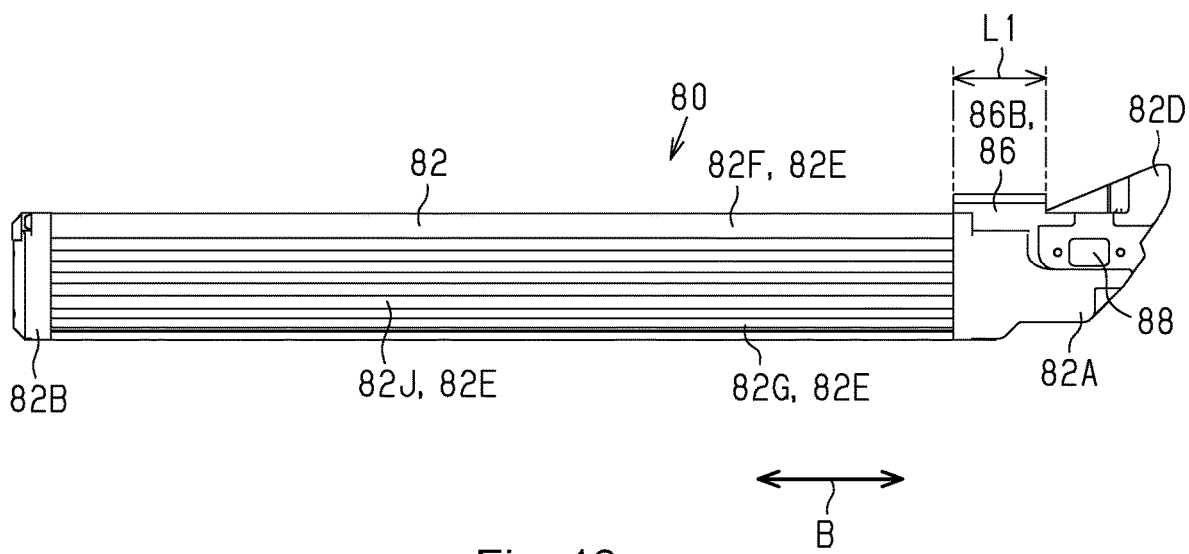
FIG. 13 is a side elevational view of the battery unit shown in FIG. 1 taken from the second side.
Figure 14:
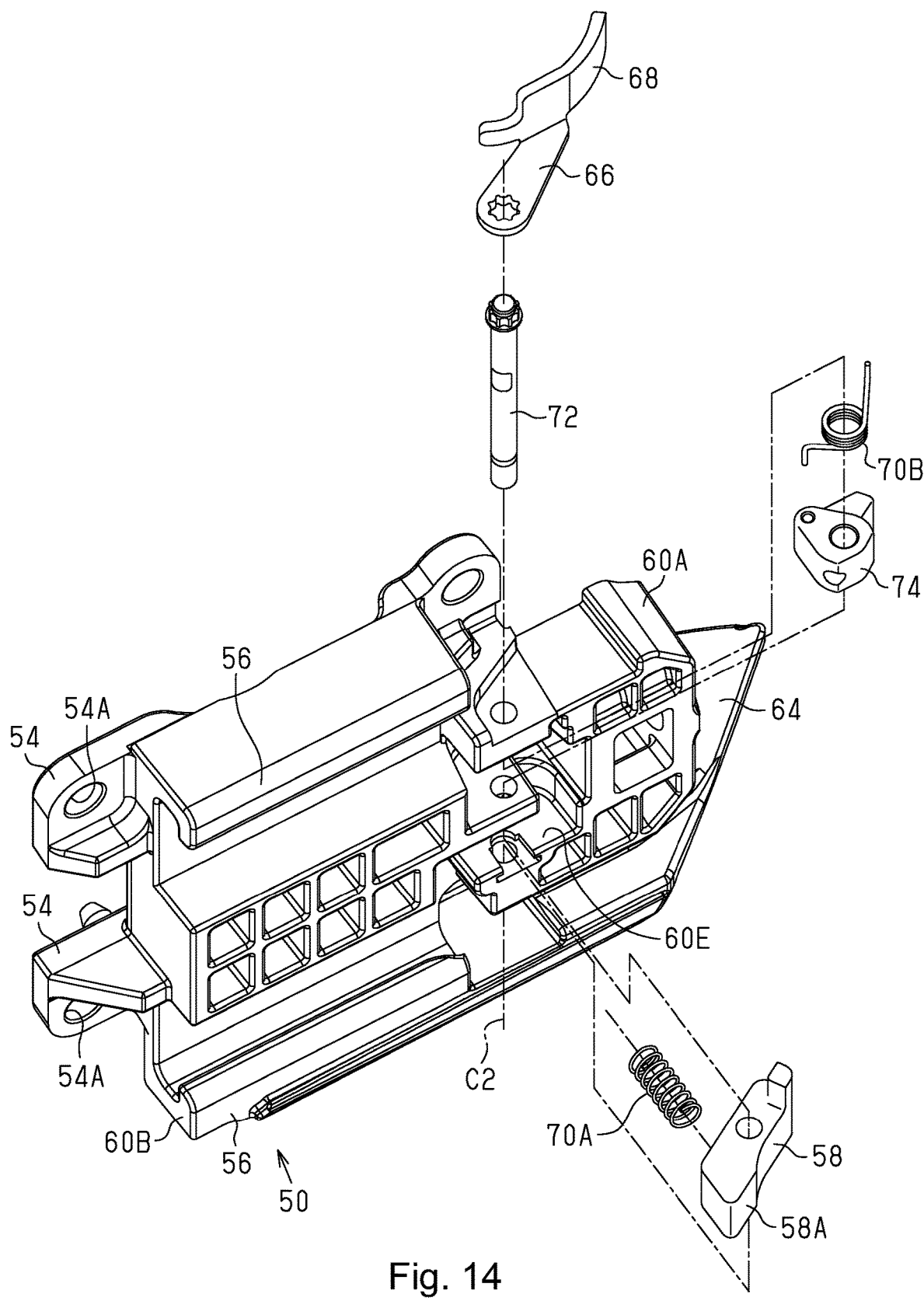
FIG. 14 is an exploded perspective view of the battery holder shown in FIG. 9.
Figure 15:
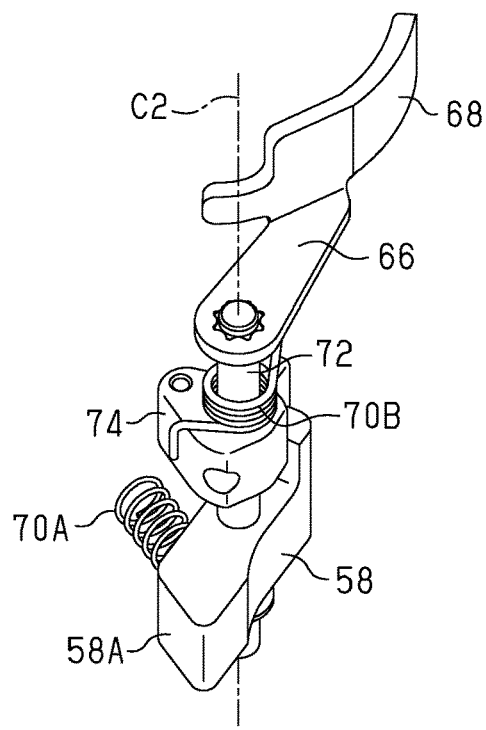
FIG. 15 is a perspective view of a restriction, an operating portion, a biasing portion, a shaft, and a control member shown in FIG. 14.
Figure 16:
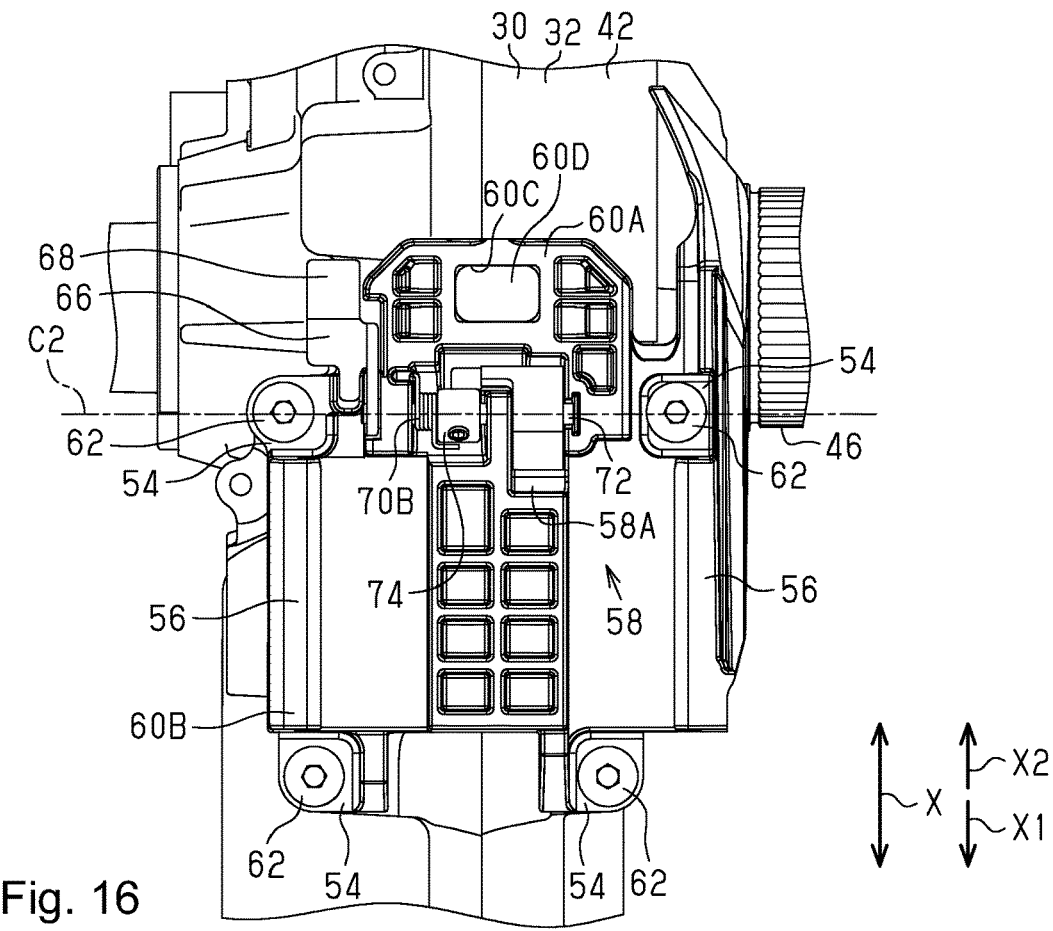
FIG. 16 is a bottom view of the battery holder and the drive unit shown in FIG. 9.
Figure 17:
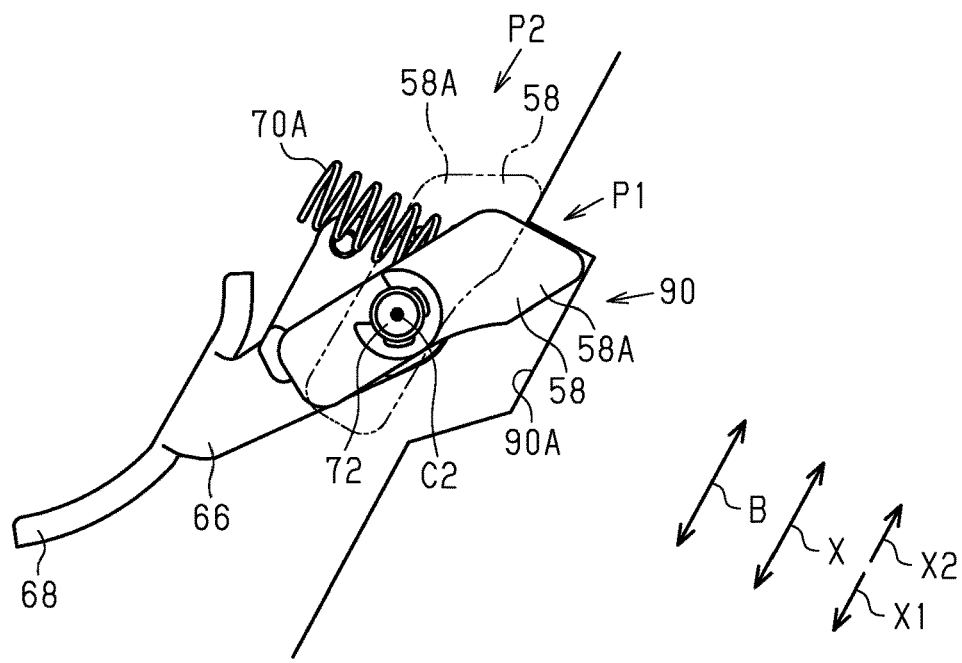
FIG. 17 is a schematic diagram illustrating a first position and a second position of the restriction shown in FIG. 15.
Figure 18:
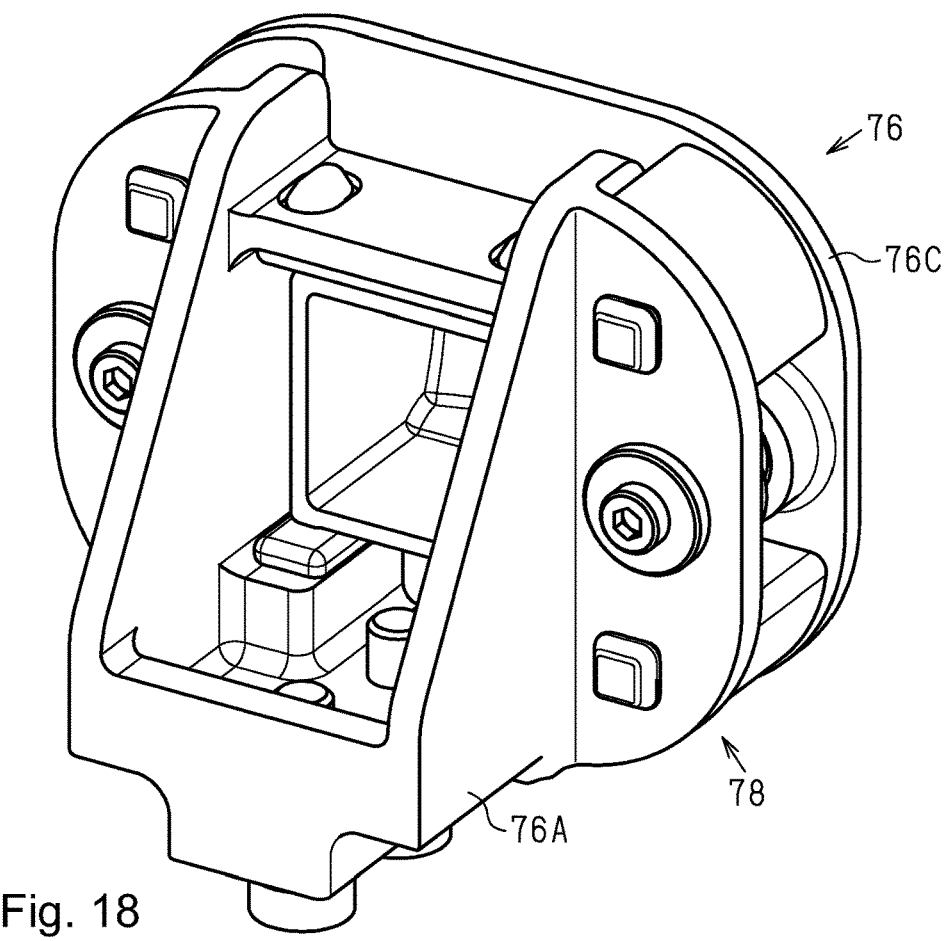
FIG. 18 is a perspective view of a support of the battery holder shown in FIG. 2.
Figure 19:
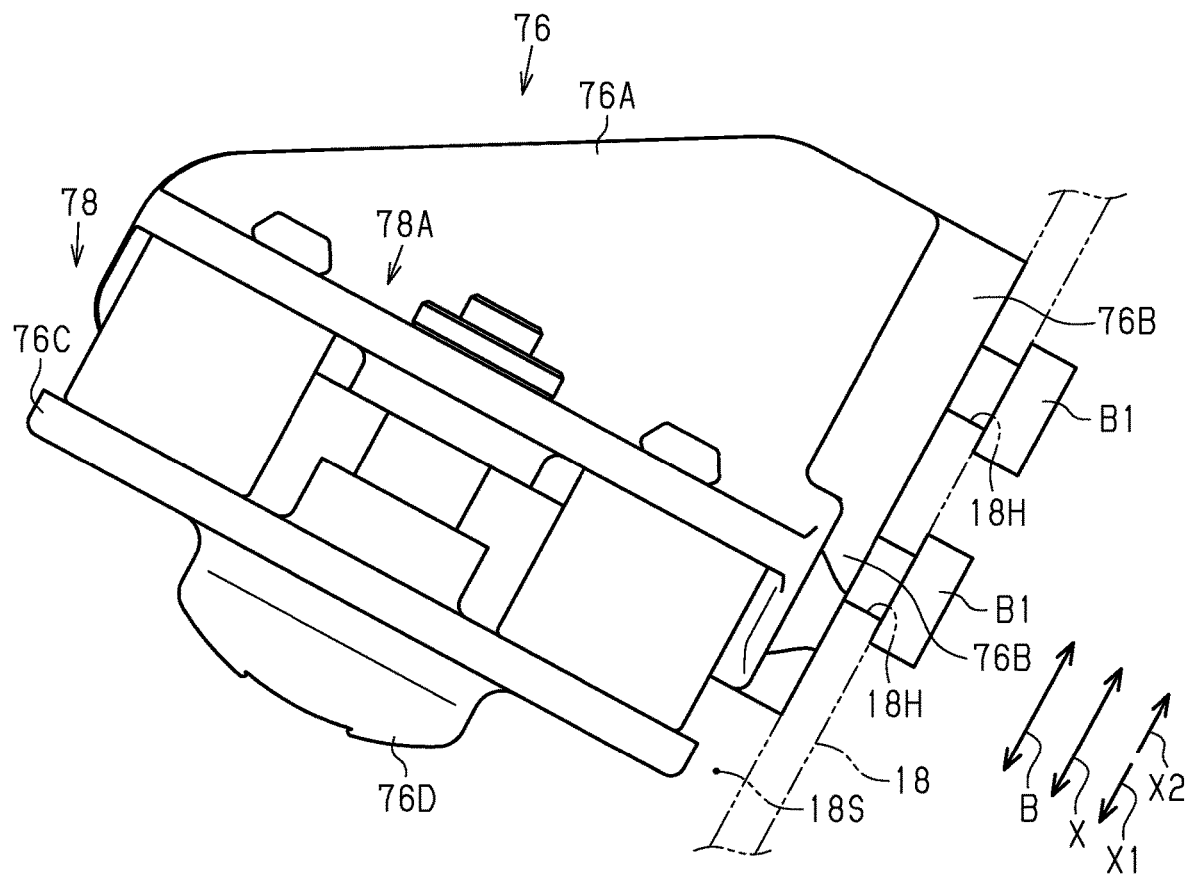
FIG. 19 is a side elevational view of the support shown in FIG. 18 taken from the first side.
Figure 20:
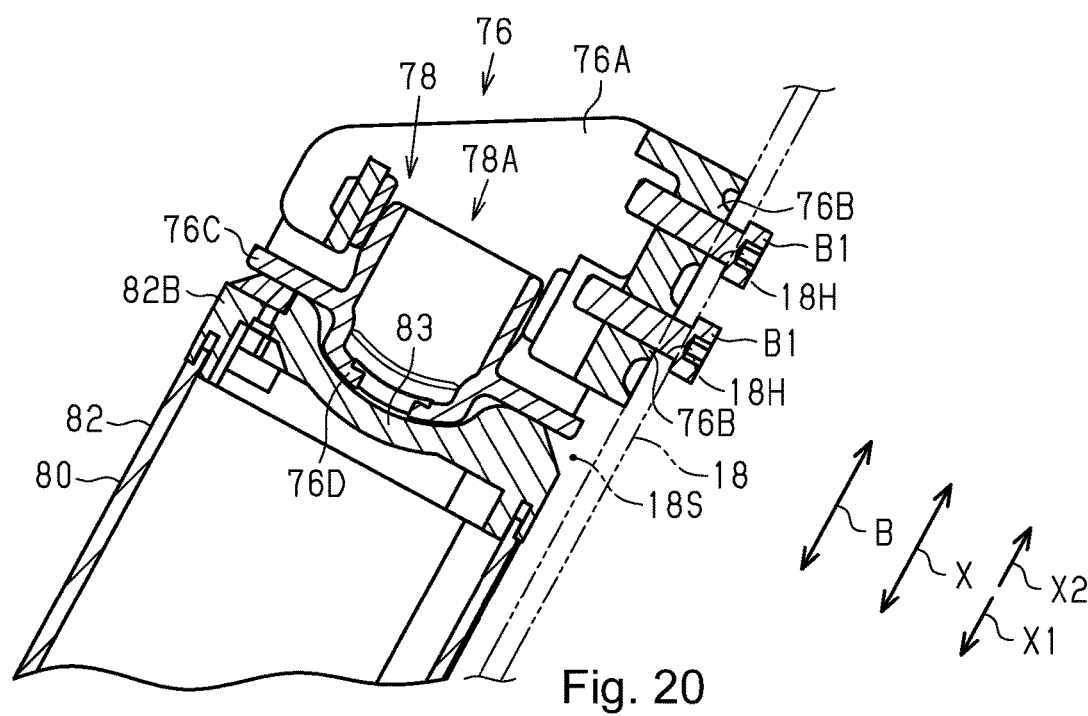
FIG. 20 is a partially cross-sectional view of the support of the battery holder taken along section line D20-D20 shown in FIG. 4.

Preferably, the frame attaching portion 34 is provided on an outer circumferential portion of the base 32. Preferably, as seen in FIG. 9, the frame attaching portion 34 includes a plurality of the frame attaching portions 34. At least one of the frame attaching portions 34 can project outward from the outer circumferential portion of the base 32. The frame attaching portions 34 each include at least one of a hole 34A and an internal thread portion 34B. Preferably, at least one of the hole 34A and the internal thread portion 34B extends in a direction parallel to the axial direction C of the crank axle 44.

The frame attaching portions 34 include at least one first frame attaching portion 35A and at least one second frame attaching portion 35B. The at least one first frame attaching portion 35A is open toward one side of a direction parallel to the axial direction C of the crank axle 44. The at least one second frame attaching portion 35B is open toward the other side of the direction parallel to the axial direction C of the crank axle 44. Preferably, as viewed in the axial direction of the crank axle 44, the at least one first frame attaching portion 35A is overlapped with the at least one second frame attaching portion 35B. In the axial direction of the crank axle 44, the at least one first frame attaching portion 35A is provided on a first side surface 32A of the base 32. In the axial direction of the crank axle 44, the at least one second frame attaching portion 35B is provided on a second side surface 32B of the base 32. The first side surface 32A includes the first hole 42A. The second side surface 32B includes the second hole 42B.

The at least one first frame attaching portions 35A and the at least one second frame attaching portion 35B can be the same in number or differ in number. In a case where the number of the at least one first frame attaching portion 35A and the at least one second frame attaching portion 35B differ in number, it is preferred that the at least one first frame attaching portion 35A be greater in number than the at least one second frame attaching portion 35B. In a case where the number of the at least one first frame attaching portion 35A provided on the first side surface 32A, where the first rotational body is located, is greater than the number of the at least one second frame attaching portion 35B, the drive unit 30 can be stably fastened to the frame 18. In the present embodiment, the number of the at least one first frame attaching portion 35A is three, and the number of the at least one second frame attaching portion 35B is two.

In a case where the number of the at least one first frame attaching portion 35A is three, it is preferred that the center of the crank axle 44 be disposed in a region surrounded by line segments that connect the centers of the holes 34A of the at least one first frame attaching portions 35A or the centers of the internal thread portions 34B of the at least one first frame attaching portions 35A, as viewed in the axial direction C of the crank axle 44.

Preferably, in a state in which each of the wheels 14 of the human-powered vehicle 10 is in contact with level ground, one first frame attaching portion 35A and one second frame attaching portion 35B are disposed between the crank axle 44 and the rear wheel 14A, as viewed in the axial direction C of the crank axle 44. In a state in which each of the wheels 14 of the human-powered vehicle 10 is in contact with level ground, another first frame attaching portions 35A and another second frame attaching portions 35B are disposed between the crank axle 44 and the front wheel 14B, as viewed in the axial direction C of the crank axle 44.

In a case where the at least one first frame attaching portion 35A includes a plurality of the first frame attaching portions 35A, the first frame attaching portions 35A are arranged at positions spaced apart from the rotational axis R of the crank axle 44 by substantially equal distances and arranged in intervals about the rotational axis R of the crank axle 44, as viewed in the axial direction C of the crank axle 44. In a case where the at least one second frame attaching portion 35B includes a plurality of second frame attaching portions 35B, the second frame attaching portions 35B are arranged at positions spaced apart from the rotational axis R of the crank axle 44 by substantially equal distances and arranged in intervals about the rotational axis R of the crank axle 44, as viewed in the axial direction C of the crank axle 44.

In a case where the motor 36 is provided on the housing 42 so that the rotational axis C1 of the motor 36 is substantially parallel to the rotational axis R of the crank axle 44, the frame attaching portions 34 are disposed at positions closer to the rotational axis C1 of the motor 36 than the rotational axis R of the crank axle 44, as viewed in the axial direction C of the crank axle 44.

The frame 18 includes a plurality of the drive unit attaching portions 24. Each of the drive unit attaching portions 24 includes at least one of a hole 24A and an internal thread portion. The drive unit attaching portions 24 are arranged at positions respectively corresponding to the frame attaching portions 34. In a case where the drive unit attaching portions 24 are coupled to the frame attaching portions 34 by bolts, the drive unit 30 is attached to the frame 18. In the present embodiment, the frame attaching portions 34 are directly coupled to the drive unit attaching portions 24 but can be coupled by a bracket to each other.

Preferably, the battery unit 80 is attached to the drive unit 30 by the battery holder 50. Preferably, the battery unit 80 includes a housing 82 and one or more battery cells 84. The housing 82 defines an accommodation compartment 82S and includes a first end 82A and a second end 82B in a longitudinal direction B. The one or more battery cells 84 are arranged in the accommodation compartment 82S. The housing 82 is configured to be attachable to and removable from the battery holder 50 by a threaded member 40 extending substantially parallel to the longitudinal direction B. Preferably, the battery unit 80 is at least partially arranged in the interior space 18S of the frame 18. Preferably, the battery unit 80 is at least partially arranged outside the interior space 18S of the frame 18. Preferably, the battery unit 80 is at least partially arranged in at least one of the downtube 18A or the seat tube 18B of the frame 18. In the present embodiment, the battery unit 80 is at least partially arranged in the downtube 18A. The battery unit 80 is arranged in the interior space 18S of the frame 18 so that the longitudinal direction B of the housing 82 is substantially parallel to a direction in which the downtube 18A extends. The phrase substantially parallel covers a range allowed for a coupling tolerance and a range of ten degrees or less, for example, five degrees, allowed for inclination of one of the two components relative to the other one of the two components.

The battery holder 50 is formed separately from the frame 18 of the human-powered vehicle 10. The battery holder 50 includes a battery attachment portion 52 and at least one drive unit connection portion 54. The battery attachment portion 52 can also be more simply referred to as a battery attachment. Also, the drive unit connection portion 54 can also be more simply referred to as a drive unit connection.

In the present embodiment, the battery holder 50 is formed separately from the base 32 of the drive unit 30. In the present embodiment, the battery holder 50 includes the battery attachment portion 52. The battery holder 50 is attached to the base 32 of the drive unit 30 in a removable manner. Preferably, the battery holder 50 further includes a main body 60. Preferably, the main body 60 is shaped in correspondence with the outer surface of the housing 42 of the drive unit 30. Preferably, the main body 60 includes a metal material. The main body 60 can include a resin material. Preferably, the battery attachment portion 52, the at least one drive unit connection portion 54, and at least one guide portion 56 are formed integrally with the main body 60.

The at least one drive unit connection portion 54 is connected to the drive unit 30 that rotatably supports the crank axle 44 of the human-powered vehicle 10. The at least one drive unit connection portion 54 is provided on a peripheral portion of the main body 60. Preferably, the at least one drive unit connection portion 54 includes a plurality of the drive unit connection portions 54. The at least one drive unit connection portion 54 includes, for example, four drive unit connection portions 54. Each of the at least one drive unit connection portions 54 is attached to the drive unit 30 by an attaching member 62. Preferably, the at least one drive unit connection portion 54 includes a hole 54A. The attaching member 62 is formed by, for example, a bolt and includes an external thread portion 62A. The external thread portion 62A of the attaching member 62 is inserted into the hole 54A and joined with an internal thread portion 42C provided in the housing 42 of the drive unit 30. This fastens the at least one drive unit connection portion 54 to the housing 42. The four drive unit connection portions 54 are spaced apart both in a direction parallel to the axial direction C of the crank axle 44 and a direction substantially orthogonal to the axial direction C of the crank axle 44. The four drive unit connection portions 54 are respectively arranged on two ends of the main body 60 in a direction parallel to the axial direction C of the crank axle 44 and on two ends of the main body 60 in a direction substantially orthogonal to the axial direction C of the crank axle 44. The attaching member 62 includes a tool engagement portion 62B. In a case where the attaching member 62 is formed by a bolt, the tool engagement portion 62B is formed in the head of the bolt. In the present embodiment, the tool engagement portion 62B includes a recess. The recess is shaped for engagement with a wrench. The at least one drive unit connection portion 54 is provided at a position faced toward the battery unit 80 in a state in which the battery unit 80 is held by the battery holder 50. The hole 54A formed in the at least one drive unit connection portion 54 extends non-parallel to the axial direction C of the crank axle 44. In the present embodiment, the holes 54A in the drive unit connection portions 54 extend substantially perpendicular to an imaginary plane extending parallel to the axial direction C of the crank axle 44. The tool engagement portions 62B of the attaching members 62 are provided at positions faced toward the battery unit 80 in a state in which the battery unit 80 is held by the battery holder 50. The battery holder 50 holds the battery unit 80 in a manner obstructing engagement of a tool with the tool engagement portions 62B of the attaching members 62 in a state in which the battery unit 80 is held by the battery holder 50.

The battery holder 50 further includes a cover 64. Preferably, the cover 64 covers part of an end surface of the housing 42 of the drive unit 30 in a direction parallel to the axial direction C of the crank axle 44. The cover 64 is connected to a first end 60A of the main body 60 in a direction parallel to the axial direction C of the crank axle 44. The cover 64 is formed integrally with the main body 60 as a one-piece component. Preferably, the first end 60A is the end of the main body 60 located at the side at which the first end 44A of the crank axle 44 is provided in the axial direction C of the crank axle 44. The cover 64 extends from the first end 60A of the main body 60 in a direction orthogonal to the axial direction C of the crank axle 44 toward the drive unit 30. The cover 64 can be omitted.

The battery unit 80 is attached to the battery attachment portion 52 by the threaded member 40 in a removable manner. Preferably, the threaded member 40 includes at least one of a bolt 40A and a nut. Further, the battery attachment portion 52 includes at least one of an internal thread portion 52A, an external thread portion, and a through hole 52B. The internal thread portion 52A is configured to be joined with the bolt 40A. The external thread portion is configured to be joined with the nut. The through hole 52B is configured to allow passage of part of the bolt 40A. Preferably, at least one of the internal thread portion 52A, the external thread portion, and the through hole 52B extends in a direction substantially parallel to a predetermined direction X. Preferably, at least one of the internal thread portion 52A, the external thread portion, and the through hole 52B extends in the predetermined direction X.

Preferably, in a state in which the at least one drive unit connection portion 54 is connected to the drive unit 30, the predetermined direction X is non-parallel to the axial direction C of the crank axle 44. Preferably, in a state in which the at least one drive unit connection portion 54 is connected to the drive unit 30, the predetermined direction X is a direction substantially orthogonal to a direction parallel to the axial direction C of the crank axle 44.

Preferably, the threaded member 40 includes at least one of the bolt 40A and a nut. Further, the first end 82A of the housing 82 of the battery unit 80 includes at least one of an internal thread portion, an external thread portion, and a through hole 82C. The internal thread portion is configured to be joined with the bolt 40A. The external thread portion is configured to be joined with the nut. The through hole 82C is configured to allow for passage of part of the bolt 40A. Preferably, the first end 82A includes a projected portion 82D projecting in a direction non-parallel to the longitudinal direction B of the housing 82. The projected portion 82D includes at least one of the external thread portion, the internal thread portion, and the through hole 82C.

The threaded member 40 of the present embodiment includes the bolt 40A. Further, the battery attachment portion 52 includes the internal thread portion 52A and the through hole 52B. The first end 82A of the housing 82 of the battery unit 80 includes the through hole 82C. The through hole 52B is provided in the main body 60. The main body 60 includes the first end 60A and a second end 60B in the predetermined direction X. The through hole 52B is provided in the first end 60A of the main body 60 in the predetermined direction X. In a state in which the at least one drive unit connection portion 54 is connected to the drive unit 30, the drive unit 30 is connected to the frame 18, and each of the wheels 14 of the human-powered vehicle 10 is in contact with level ground, the first end 60A corresponds to the lower end of the main body 60. The main body 60 includes an arrangement portion 60C on which the internal thread portion 52A is arranged. In the predetermined direction X, the arrangement portion 60C is provided between the through hole 52B and the second end 60B of the main body 60. Preferably, the internal thread portion 52A is formed separately from the main body 60. Preferably, the internal thread portion 52A includes a metal material. Preferably, the internal thread portion 52A is attached to the main body 60 in a non-removable manner. For example, the internal thread portion 52A is formed in an insertion member 60D that is formed separately from the main body 60. For example, the arrangement portion 60C includes a recess or a hole, and the insertion member 60D is inserted into the arrangement portion 60C. Preferably, the insertion member 60D is attached to the main body 60 in a non-removable manner. The insertion member 60D can be press-fitted to the main body 60, attached to the main body 60 by an adhesive, or insert-molded in the main body 60. The insertion member 60D can be formed integrally with the main body 60 as a one-piece component. In this case, it is preferred that the through hole 52B be omitted and that the threaded hole of the internal thread portion 52A be extended to the outer surface of the first end 60A of the main body 60.

Preferably, the battery attachment portion 52 is configured so that the battery unit 80 is attached to the battery attachment portion 52 with the longitudinal direction B of the battery unit 80 being substantially parallel to the predetermined direction X. Preferably, the predetermined direction X is substantially parallel to a direction in which the downtube 18A or the seat tube 18B of the frame 18 extends in a state in which the at least one drive unit connection portion 54 is provided on the drive unit 30, and the drive unit 30 is provided on the human-powered vehicle 10.

Preferably, the battery holder 50 further includes the at least one guide portion 56. The at least one guide portion 56 guides the battery unit 80 in the predetermined direction X in a case where the battery unit 80 is attached or removed. The at least one guide portion 56 is configured to guide the battery unit 80 in the predetermined direction X in a case where the battery unit 80 is attached to or removed from the battery attachment portion 52. Preferably, the at least one guide portion 56 is formed integrally with the main body 60 as a one-piece component. The at least one guide portion 56 can be formed separately from the main body 60 and fastened to the main body 60 by bolts, rivets, or an adhesive. In the present embodiment, the at least one guide portion 56 includes a first guide portion 56A and a second guide portion 56B. The first guide portion 56A and the second guide portion 56B are spaced apart from each other in a direction parallel to the axial direction C of the crank axle 44. The first guide portion 56A extends parallel to the second guide portion 56B.

Preferably, the battery unit 80 further includes at least one guided portion 86. The at least one guided portion 86 is provided on the housing 82 and guided by the at least one guide portion 56 that is provided on the battery holder 50 or on the frame 18 of the human-powered vehicle 10. In the present embodiment, the at least one guided portion 86 is guided by the at least one guide portion 56 provided on the battery holder 50. Preferably, the at least one guided portion 86 extends in the longitudinal direction B of the housing 82. Preferably, the at least one guided portion 86 is provided on a side surface 82E of the housing 82 that is located between the projected portion 82D and the second end 82B. The side surface 82E includes a first side surface 82F and a second side surface 82G in a direction substantially orthogonal to the longitudinal direction B. Preferably, the projected portion 82D and the at least one guided portion 86 are provided on the first side surface 82F of the housing 82 that is located toward one side of a direction substantially orthogonal to the longitudinal direction B. Preferably, the first side surface 82F includes the upper one of the first side surface 82F and the second side surface 82G in a direction substantially orthogonal to the longitudinal direction B in a state in which the battery unit 80 is attached to the frame 18, and each of the wheels 14 of the human-powered vehicle 10 is in contact with level ground. Preferably, the at least one guided portion 86 is formed integrally with the housing 82 as a one-piece component. The at least one guided portion 86 can be formed separately from the housing 82 and fastened to the housing 82 by bolts, rivets, or an adhesive. The housing 82 can be formed from, for example, a resin material or a metal material. Alternatively, the housing can include one part formed from a resin material and another part formed from a metal material.

Preferably, the at least one guided portion 86 includes a plurality of the guided portions 86 provided on the first side surface 82F at separate positions in a direction orthogonal to the longitudinal direction B. In the present embodiment, the at least one guided portion 86 includes a first guided portion 86A and a second guided portion 86B. The first guided portion 86A extends parallel to the second guided portion 86B. The first guided portion 86A is provided at one end of the first side surface 82F in a direction orthogonal to the longitudinal direction B. The second guided portion 86B is provided at the other end of the first side surface 82F in the direction orthogonal to the longitudinal direction B. In a case where the at least one guided portion 86 includes a plurality of the guided portions 86, the number of the at least one guided portion 86 corresponds to the number of the guide portions 56. Preferably, the number and the positions of the at least one guided portion 86 correspond to the number and the positions of the at least one guide portion 56.

Preferably, the at least one guide portion 56 and the at least one guided portion 86 are configured to restrict movement of the battery unit 80 relative to the drive unit 30 in a direction non-parallel to the predetermined direction X in a state in which the at least one guided portion 86 is guided by the at least one guide portion 56. Preferably, the at least one guide portion 56 and the at least one guided portion 86 are shaped in a complementing manner. For example, one of the at least one guide portion 56 and the at least one guided portion 86 includes a recess extending in the predetermined direction X, and the other one of the at least one guide portion 56 and the at least one guided portion 86 includes a projection extending in the predetermined direction X. Preferably, the recess is recessed in a direction parallel to the axial direction C of the crank axle 44, the projection is projected in a direction parallel to the axial direction C of the crank axle 44. In the present embodiment, the at least one guide portion 56 includes a recess extending in the predetermined direction X, and the at least one guided portion 86 includes a projection extending in the predetermined direction X. In the present embodiment, the first guide portion 56A includes at least one of a projection projected toward the second guide portion 56B and a recess recessed facing the second guide portion 56B. In the present embodiment, the second guide portion 56B includes at least one of a projection projected toward the first guide portion 56A and a recess recessed facing the first guide portion 56A. In the present embodiment, the first guided portion 86A includes at least one of a projection projected toward the side opposite to the second guided portion 86B in a direction perpendicular to the longitudinal direction B of the battery unit 80 and a recess recessed toward the second guided portion 86B in a direction perpendicular to the longitudinal direction B of the battery unit 80. In the present embodiment, the second guided portion 86B includes at least one of a projection projected toward the side opposite to the first guided portion 86A in a direction perpendicular to the longitudinal direction B of the battery unit 80 and a recess recessed toward the first guided portion 86A in a direction perpendicular to the longitudinal direction B of the battery unit 80.

The at least one guided portion 86 is provided on the first end 82A of the battery unit 80. The at least one guided portion 86 has length L1 in a direction in which the at least one guided portion 86 extends. Length L1 can be the same as or differ from length L2 of the at least one guide portion 56 in a direction in which the at least one guide portion 56 extends. Length L1 is, for example, included in a range greater than or equal to 0.5 times length L2 and less than or equal to two times length L2. In a case where the battery unit 80 is attached to the frame 18, one of the projection and the recess of the at least one guided portion 86 is inserted to the other one of the projection and the recess of the at least one guide portion 56 so that the battery unit 80 is guided in a direction in which the at least one guide portion 56 extends. The at least one guided portion 86 can extend to the second end 82B of the housing 82 of the battery unit 80. In the present embodiment, the first guided portion 86A and the second guided portion 86B are located between the first guide portion 56A and the second guide portion 56B in a state in which the at least one guide portion 56 is guided by the at least one guided portion 86. The first guide portion 56A and the second guide portion 56B can be located between the first guided portion 86A and the second guided portion 86B in a state in which the at least one guide portion 56 is guided by the at least one guided portion 86. In this case, the direction in which the recess is recessed and the projection is projected will be opposite to the direction in which the recess is recessed and the projection is projected in a case where the first guided portion 86A and the second guided portion 86B are located between the first guide portion 56A and the second guide portion 56B.

Preferably, the housing 82 is substantially box-shaped and includes a third side surface 82H and a fourth side surface 82J that differ from the first side surface 82F and the second side surface 82G in a direction substantially orthogonal to the longitudinal direction B of the housing 82. Preferably, the fourth side surface 82J includes a first end 80A where an electric connector 88 is provided. Preferably, the electric connector 88 is connected to an electric wiring unit 100. The electric connector 88 includes a discharging terminal, a charging terminal, and a communication terminal. The discharging terminal and the charging terminal can be the same terminal.

Preferably, the battery holder 50 further includes a restriction 58. The restriction 58 is configured to restrict movement of the battery unit 80 in a first direction X1 of the predetermined direction X in which the battery unit 80 is removed. Preferably, the restriction 58 is disposed between the battery unit 80 and the drive unit 30 as viewed in a direction parallel to the crank axle 44 in a state in which the battery unit 80 is held by the battery holder 50, and the drive unit 30 is connected to the human-powered vehicle 10.

The restriction 58 is configured to be movable between a first position P1 where the restriction 58 restricts movement of the battery unit 80 and a second position P2 where the restriction 58 does not restrict movement of the battery unit 80. Preferably, the battery holder 50 further includes a biasing portion 70A that biases the restriction 58 from the second position P2 toward the first position P1.

Preferably, the battery holder 50 includes an operating portion 66 that is configured to operate the restriction 58. The operating portion 66 includes a lever member 68 rotated about a predetermined rotational axis C2. Preferably, the predetermined rotational axis C2 extends substantially perpendicular to the predetermined direction X. Preferably, a user can operate the operating portion 66 with one hand. The user can operate the operating portion 66 with one hand and hold the battery unit 80 with the other hand so that the battery unit 80 does not fall. The lever member 68 is, for example, shaped so that the user can easily move the lever member 68 with a finger. The lever member 68 is, for example, curved and recessed in a direction in which the lever member 68 is operated to remove the battery unit 80. The lever member 68 is located between the battery unit 80 and the drive unit 30, as viewed in a direction parallel to the axial direction C of the crank axle 44, in a state in which the battery unit 80 is held by the battery holder 50, and the drive unit 30 is connected to the human-powered vehicle 10. Thus, the lever member 68 cannot be easily reached by a foreign object. This avoids undesired operation of the lever member 68. The battery unit 80 is located between a first imaginary plane and a second imaginary plane in a state in which the battery unit 80 is held by the battery holder 50 and the battery holder 50 is connected to the drive unit 30. The first imaginary plane extends perpendicular to the axial direction C of the crank axle 44 over one end surface of the housing 82 of the drive unit 30 in the axial direction C of the crank axle 44. The second imaginary plane extends perpendicular to the axial direction C of the crank axle 44 over the other end surface of the housing 82 of the drive unit 30 in the axial direction C of the crank axle 44. The lever member 68 is located between a third imaginary plane and a fourth imaginary plane in a state in which the battery unit 80 is held by the battery holder 50 and the drive unit 30 is connected to the human-powered vehicle 10. The third imaginary plane extends perpendicular to the axial direction C of the crank axle 44 over one end surface of the battery unit 80 in the axial direction C of the crank axle 44. The fourth imaginary plane extends perpendicular to the axial direction C of the crank axle 44 over the other end surface of the battery unit 80 in the axial direction C of the crank axle 44. Thus, the lever member 68 cannot be easily reached by a foreign object. This avoids undesired operation of the lever member 68.

Preferably, the operating portion 66 is provided at a position where at least part of the operating portion 66 is covered by the electric wiring unit 100, which is electrically connected to the battery unit 80. The electric wiring unit 100 electrically connects, for example, the drive unit 30 and the battery unit 80. Preferably, the electric wiring unit 100 includes at least one of a power supply line that supplies the drive unit 30 with the electric power of the battery unit 80 and a communication line that allows for communication between the battery unit 80 and the drive unit 30. The electric wiring unit 100 includes a first connector 102, a second connector 104, and an electric cable 106. The electric cable 106 connects the first connector 102 and the second connector 104. The first connector 102 is configured to be connected with the electric connector 88 of the battery unit 80. The second connector 104 is configured to be connected with a connector 48 of the drive unit 30. The second connector 104 can be omitted and the electric cable 106 can be directly connected to a circuit board arranged in the housing of the drive unit 30.

Preferably, the battery holder 50 further includes a shaft 72 and a control member 74. Preferably, the battery holder 50 includes a lever biasing portion 70B. The restriction 58, the operating portion 66, and the lever biasing portion 70B are attached to the shaft 72. The shaft 72 is arranged on the main body 60. The shaft 72 is configured to extend through the main body 60. The shaft 72 includes a rotational axis C2. The shaft 72 is attached to the main body 60 to be rotatable about the rotational axis C2.

The restriction 58 is attached to the shaft 72 to rotate about the shaft 72. The restriction 58 includes a pawl 58A. The restriction 58 is provided on the shaft 72 and rotated about the shaft 72 to move between a position where the pawl 58A projects out of the main body 60 and a position where the pawl 58A is at least partially accommodated in a cavity 60E provided in the main body 60. In a state in which the pawl 58A is projected out of the main body 60, the restriction 58 is located at the first position P1. In a state in which the state in which the pawl 58A is accommodated in the cavity 60E, the restriction 58 is located at the second position P2. In a state in which the restriction 58 is located at the second position P2, the pawl 58A does not have to be entirely accommodated in the cavity 60E as long as the pawl 58A is located outside the movement path of the battery unit 80.

The control member 74 is attached to the shaft 72 and rotated integrally with the shaft 72. The operating portion 66 is attached to the shaft 72 and rotated integrally with the shaft 72. The lever biasing portion 70B biases the shaft 72 to rotate the shaft 72 in a first rotational direction about the rotational axis C2 of the shaft 72. This arranges the lever member 68 at the initial position in a non-operated state.

The biasing portion 70A is located between the pawl 58A and the main body 60. The biasing portion 70A is accommodated in the cavity 60E. In a case where the operating portion 66 is in a non-operated state and a force acting in the first rotational direction about the rotational axis C2 of the shaft 72 is not applied to the pawl 58A, the restriction 58 is maintained by the biasing portion 70A at the first position P1. In a case where the operating portion 66 is in a non-operated state and a force acting in a second rotational direction about the rotational axis C2 of the shaft 72 is applied to the pawl 58A, the restriction 58 is maintained at the first position P1. A case where a force acting in the second rotational direction about the rotational axis C2 of the shaft 72 is applied to the pawl 58A includes a state in which an engagement portion 90 of the battery unit 80 is engaged with the pawl 58A.

In a case where the operating portion 66 is operated to rotate the shaft 72 in the second rotational direction about the rotational axis C2, the control member 74 will be rotated together with the shaft 72. In a case where the control member 74 is rotated, the control member 74 will come into contact with the restriction 58 and rotate the restriction 58 in the second rotational direction about the rotational axis C2. This moves the restriction 58 from the first position P1 to the second position P2. In a case where the operating portion 66 is no longer operated in a state in which the restriction 58 has been moved from the first position P1 to the second position P2, the biasing force of the lever biasing portion 70B will rotate the control member 74 in the first rotational direction about the rotational axis C2. Accordingly, the lever member 68 will return to the initial position. Further, the pawl 58A, which is biased by the biasing portion 70A, will rotate in the second rotational direction about the rotational axis C2 and move the restriction 58 from the second position P2 to the first position P1.

Preferably, the battery unit 80 further includes the engagement portion 90 configured to be engaged with the restriction 58, which is arranged on the battery holder 50 to restrict movement of the battery unit 80 in a removing direction. Preferably, the engagement portion 90 is provided on the first side surface 82F. For example, the engagement portion 90 includes a pit 90A (e.g., a recess, an indentation, a hole, an opening, etc.). The restriction 58 is provided at a position corresponding to the engagement portion 90 in a state in which the battery unit 80 is attached to the battery attachment portion 52. In a case where the restriction 58 is located at the first position P1, the restriction 58 is at least partially arranged in a space defined in the pit 90A in a state in which the battery unit 80 is attached to the battery attachment portion 52. Contact of the restriction 58 with the pit 90A restricts movement of the battery unit 80 in the first direction X1. The engagement portion 90 does not have to be the pit 90A and can be formed to have any shape as long as the restriction 58 can be engaged with the engagement portion 90. For example, the engagement portion 90 can include a protrusion. The engagement portion 90 can be omitted.

Preferably, the battery holder 50 further includes a support 76. The support 76 supports the second end 82B of the housing 82. In a case where the support 76 is in contact with the second end 82B of the housing 82, movement of the battery unit 80 is restricted in a second direction X2 of the predetermined direction X in which the battery unit 80 is attached to the frame 18. The support 76 includes a main body 76A, a contact portion 76C, and a damper 78. The main body 76A includes an attachment portion 76B that is attached to the frame 18. The support 76 is attached to the frame 18 by the attachment portion 76B so that at least part of the support 76 is arranged in the interior space 18S of the frame 18. Preferably, the attachment portion 76B includes at least one of an internal thread portion, an external thread portion, and a hole. The support 76 shown in FIGS. 18 to 20 includes an internal thread portion. The support 76 is attached to the frame 18 by a bolt B1 that is inserted from the outer side of the frame 18 through a hole 18H in the frame 18 and is fastened to the internal thread portion.

Preferably, the battery attachment portion 52 is provided at a downstream side of the restriction 58 in the first direction X1. Preferably, the battery attachment portion 52 is provided at a downstream side of the guide portion 56 in the first direction X1. Preferably, the battery attachment portion 52 is at least partially located downward from the crank axle 44 in a state in which the at least one drive unit connection portion 54 is connected to the drive unit 30, the drive unit 30 is connected to the frame 18, and each of the wheels 14 of the human-powered vehicle 10 is in contact with level ground.

Preferably, the contact portion 76C is configured to be movable relative to the main body 76A. The contact portion 76C is configured to contact the second end 82B of the housing 82. Preferably, the contact portion 76C is shaped in correspondence with the second end 82B of the housing 82. The second end 82B of the housing 82 includes a concave 83 in a central part. At least part of the concave 83 is a curved surface. The contact portion 76C includes a convex 76D on a central part. At least part of the convex 76D is a curved surface. The concave 83 and the convex 76D are shaped in a complementing manner. The second end 82B of the housing 82 can include a convex, and the contact portion 76C can include a concave. Preferably, the contact portion 76C includes at least one of a metal material and a resin material. The damper 78 is located between the contact portion 76C and the main body 76A. The damper 78 includes, for example, a plunger 78A. The plunger 78A includes a rubber or an elastomer. The contact portion 76C adjusts the position of the battery unit 80 in the interior space 18S of the frame 18 in a direction non-parallel to the longitudinal direction B of the battery unit 80. The damper 78 adjusts the position of the battery unit 80 in the interior space 18S of the frame 18 in a direction parallel to the longitudinal direction B of the battery unit 80.

The operation of the restriction 58 in a case where the battery unit 80 is attached to the battery holder 50 will now be described. In a state in which the restriction 58 is located at the first position P1, in a case where the at least one guided portion 86 of the battery unit 80 is engaged with the at least one guide portion 56 and moved in the predetermined direction X, the housing 82 will come into contact with the restriction 58 and move the restriction 58 from the first position P1 to the second position P2 regardless of whether the operating portion 66 is operated. Further movement of the housing 82 along the at least one guide portion 56 will arrange part of the restriction 58 in the space defined by the walls of the pit 90A in the engagement portion 90, which is provided in the first side surface 82F of the battery unit 80. This moves the restriction 58 from the second position P2 to the first position P1.

The battery unit 80 is then attached to the battery attachment portion 52 by fastening the threaded member 40 to the battery attachment portion 52 in a state in which movement of the battery unit 80 in the first direction X1 is restricted by the restriction 58.

The operation of the restriction 58 in a case where the battery unit 80 is removed from the battery holder 50 will now be described. In a state in which the battery unit 80 is attached to the battery attachment portion 52, the threaded member 40 is removed from the battery attachment portion 52. In this case, movement of the battery unit 80 in the first direction X1 will be restricted by the restriction 58.

In a state in which the threaded member 40 is removed from the battery attachment portion 52 and movement of the battery unit 80 in the first direction X1 is restricted by the restriction 58, operation of the operating portion 66 will rotate the shaft 72 and the control member 74 and move the restriction 58 from the first position P1 to the second position P2. Then, the operating portion 66 is operated while slightly moving the battery unit 80 in the second direction X2 to easily separate the restriction 58 from the pit 90A and move the restriction 58 from the first position P1 to the second position P2. In a case where the restriction 58 is moved from the first position P1 to the second position P2, the battery unit 80 becomes movable along the at least one guide portion 56 in the first direction X1.

MODIFICATIONS

The description related with the above embodiment exemplifies, without any intention to limit, an applicable form of a battery holder for a human-powered vehicle, a drive unit for a human-powered vehicle, and a battery unit for a human-powered vehicle in accordance with the present disclosure. In addition to the embodiment described above, the battery holder for a human-powered vehicle, the drive unit for a human-powered vehicle, and a battery unit for a human-powered vehicle according to the present disclosure are applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

In the embodiment, in a state in which the battery unit 80 is attached to the battery holder 50, the restriction 58 is located at the first position P1. Alternatively, in a state in which the battery unit 80 is attached to the battery holder 50, the restriction 58 can be located at the second position P2. In this case, in a case where the battery unit 80 is moved from an attachment position where the battery unit 80 is attached to the frame 18 in the first direction X1 in which the battery unit 80 is removed, the restriction 58 can be moved from the second position P2 to the first position P1 and restrict movement of the battery unit 80 in the first direction X1 in which the battery unit 80 is removed.

The direction in which the threaded member 40 extends can differ from the direction in which the at least one guide portion 56 and the at least one guided portion 86 extend.

The at least one guide portion 56 and the at least one guided portion 86 can extend in a direction parallel to the axial direction C of the crank axle 44. The at least one guide portion 56 and the at least one guided portion 86 can extend in a direction differing from the predetermined direction X.

Figure 21:
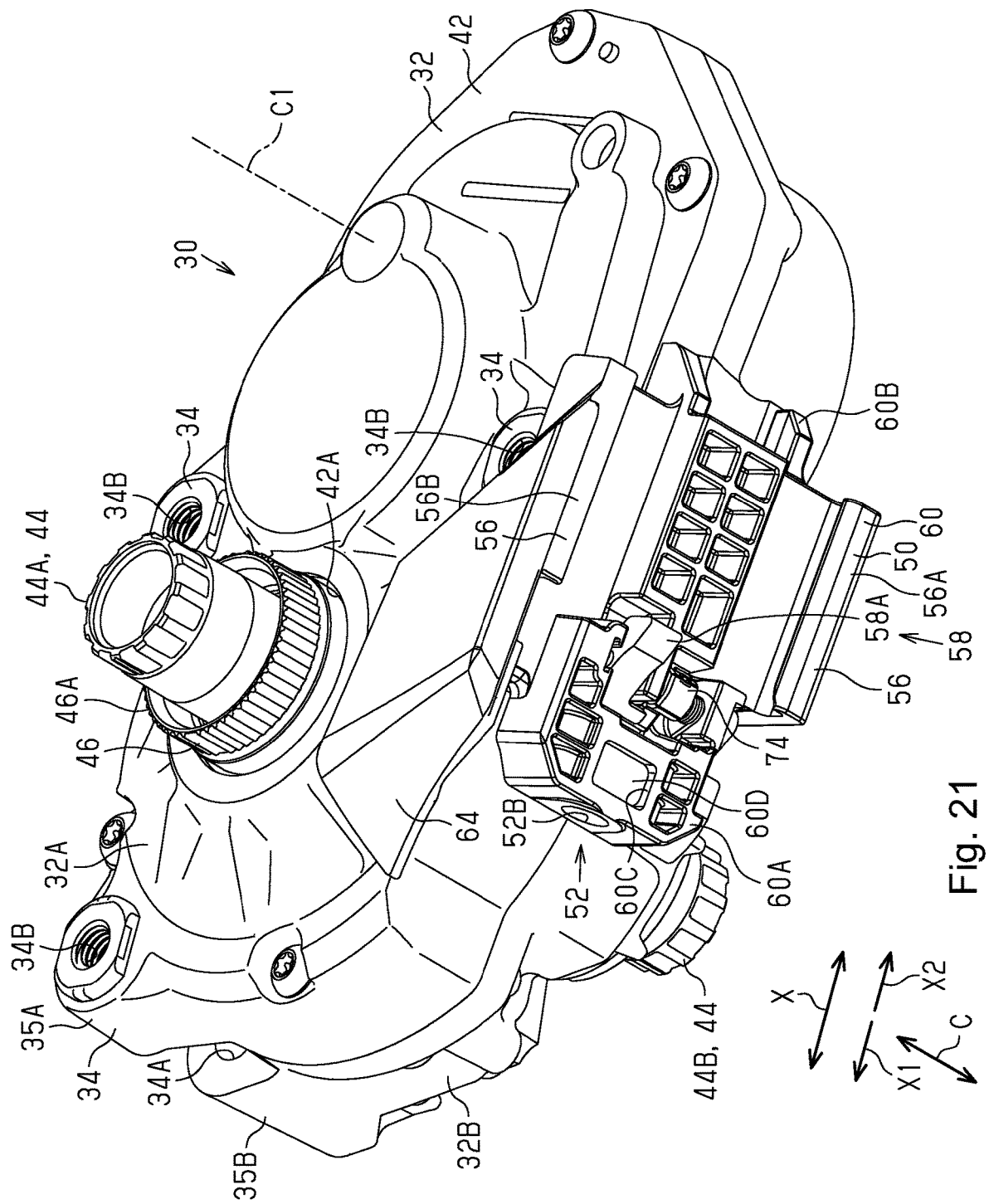
FIG. 21 is a perspective view of a drive unit for a human-powered vehicle including a battery holder for a human-powered vehicle.

As shown in FIG. 21, the battery attachment portion 52 and the at least one drive unit connection portion 54 can be formed integrally with the housing 42 of the drive unit 30. In this case, the drive unit 30 includes the base 32, the frame attaching portion 34, the motor 36, and the battery attachment portion 52. The battery attachment portion 52 is provided on the base 32, and the battery unit 80 is attached to the battery attachment portion 52 by the threaded member 40 in a removable manner. The drive unit 30 shown in FIG. 21 is provided so that the main body 60 of the battery holder 50 cannot be removed from the housing 42. The main body 60 of the battery holder 50 can be formed integrally with the housing 42 as a one-piece component. The main body 60 can be integrated with the housing 42 by an adhesive or the like or insert-molded with the housing 42.

Figure 22:
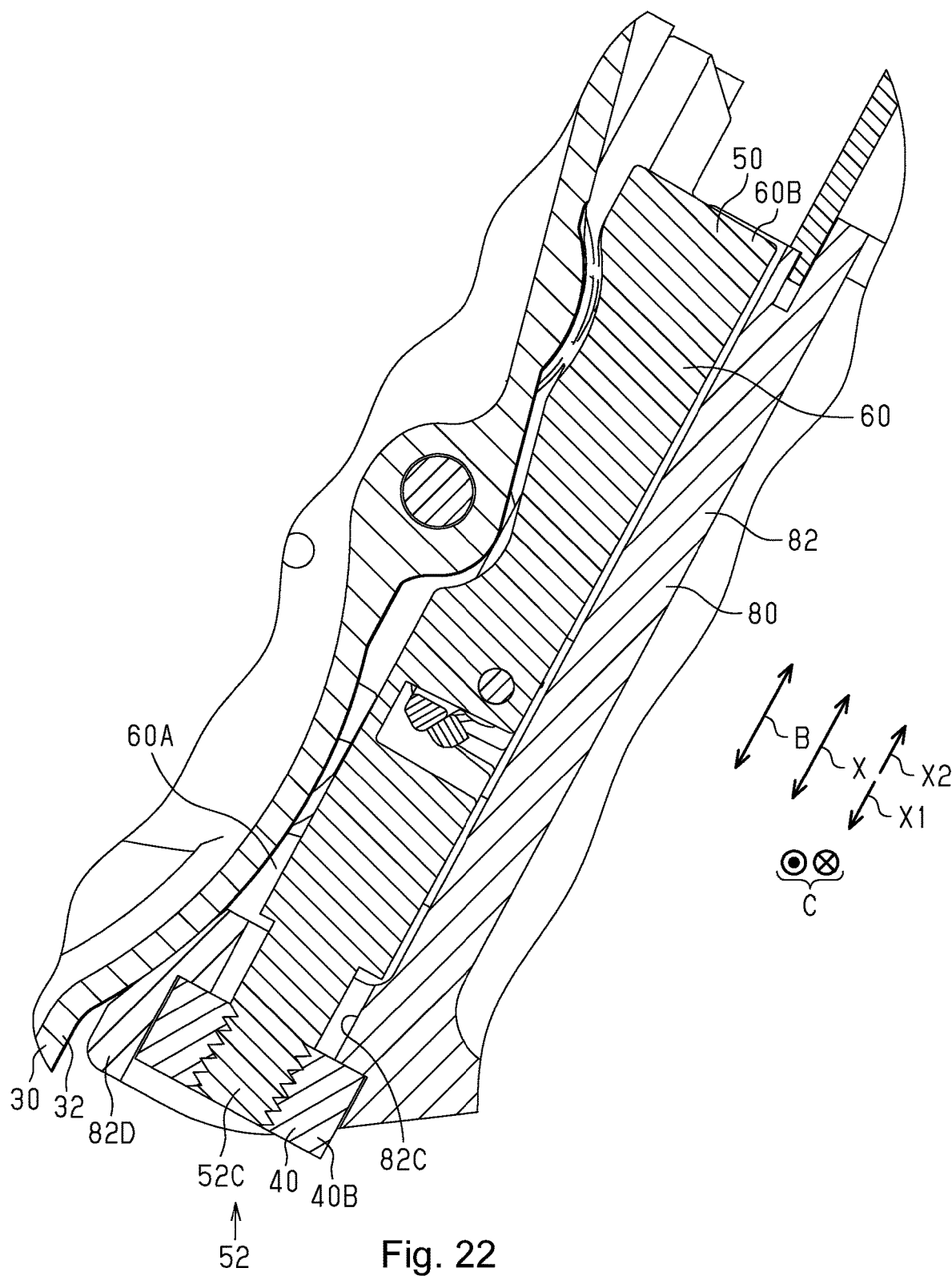
FIG. 22 is a cross-sectional view of a portion of the battery holder showing the structure of a battery attaching attachment in accordance with a modification.

As shown in FIG. 22, the threaded member 40 can include a nut 40B, and the battery attachment portion 52 can include an external thread portion 52C configured to be joined with the nut 40B. In this case, the first end 82A of the housing 82 of the battery unit 80 includes the through hole 82C configured to allow passage of part of the external thread portion 52C. Thus, the battery attachment portion 52 and the battery unit 80 can be changed as long as the battery unit 80 is configured to be attachable to and removable from the frame 18 by the threaded member 40.

The internal thread portion 52A of the battery attachment portion 52 can be formed by a nut. In this case, at least part of the battery attachment portion 52 is attached to the main body 60 in a removable manner.

The battery holder 50 does not have to include the at least one drive unit connection portion 54. In this case, the battery holder 50 includes the battery attachment portion 52 and the at least one guide portion 56, and the at least one guide portion 56 guides the battery unit 80 in the predetermined direction X to attach or remove the battery unit 80. For example, the battery holder 50 can be attached to the frame 18.

The battery holder 50 includes the at least one drive unit connection portion 54, the at least one guide portion 56, and the restriction 58. The restriction 58 is configured to restrict movement of the battery unit 80 in the first direction X1 of the predetermined direction X in which the battery unit 80 is removed. The restriction 58 is located between the battery unit 80 and the drive unit 30 in a state in which the battery unit 80 is held by the battery holder 50, and the drive unit 30 is connected to the human-powered vehicle 10, as viewed in a direction parallel to the crank axle 44. Preferably, the battery holder 50 further includes the battery attachment portion 52 to which the battery unit 80 is attached in a removable manner. Alternatively, the battery holder 50 does not have to include the battery attachment portion 52. In a case where the battery holder 50 does not include the battery attachment portion 52, for example, the frame 18 or the drive unit 30 can include a first support that supports the first end 82A of the housing 82 of the battery unit 80. The battery unit 80 will be attached to the frame 18 in a case where the battery unit 80 is sandwiched between the support 76 and the first support.

The drive unit 30 can be a drive unit that includes a transmission configured to change a ratio of the rotational speed of the input rotational shaft to the rotational speed of the first rotational body. In a case where the drive unit 30 is a drive unit that includes the transmission, which is configured to change the ratio of the rotational speed of the input rotational shaft to the rotational speed of the first rotational body, the motor 36 can be omitted.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A battery holder formed separately from a frame of a human-powered vehicle, the battery holder comprising:
    a battery attachment portion configured to be attached to a battery unit by a threaded member in a removable manner such that the battery unit receives the threaded member; and
    at least one guide portion configured to guide the battery unit in a predetermined direction in a case where the battery unit is being attached or being removed from the battery attachment portion in a state in which the battery attachment portion and the at least one guide portion are connected to the frame,
    a removal direction of the threaded member from the battery attachment portion being substantially parallel to the predetermined direction,
    the battery attachment portion and the at least one guide portion being integrally formed as a one-piece member, and
    a length of the at least one guide portion extending in a direction parallel to the predetermined direction, a height and a width of the at least one guide portion being perpendicular to the predetermined direction, and the length of the at least one guide portion being larger than the height and the width of the at least one guide portion.

2. The battery holder according to claim 1, wherein
    the threaded member includes at least one of a bolt and a nut, and
    the battery attachment portion includes at least one of an internal thread portion configured to be joined with the bolt, an external thread portion configured to be joined with the nut, and a through hole configured to allow passage of part of the bolt.

3. The battery holder according to claim 2, wherein
    the at least one of the internal thread portion, the external thread portion, and the through hole extends in the predetermined direction.

4. A battery holder formed separately from a frame of a human-powered vehicle, the human-powered vehicle including the frame, the frame including a seat tube and a downtube, a fork directly connected to the frame, and a handlebar connected to the fork, the battery holder comprising:
    at least one drive unit connection portion configured to be connected to a drive unit that rotatably supports a crank axle of the human-powered vehicle, the at least one drive unit connection portion being configured to be connected to the drive unit without being directly connected to the frame of the human-powered vehicle;
    at least one guide portion configured to guide a battery unit in a predetermined direction in a case where the battery unit is being attached or being removed from the battery attachment portion; and
    a restriction configured to restrict movement of the battery unit in a first direction of the predetermined direction in which the battery unit is being removed from the battery attachment portion,
    wherein the restriction is located between the battery unit and the drive unit as viewed in a direction parallel to the crank axle in a state in which the battery unit is held by the battery holder and the drive unit is connected to the human-powered vehicle.

5. The battery holder according to claim 4, further comprising
    a battery attachment portion to configured to be attached to the battery unit in a removable manner.

6. A battery holder formed separately from a frame of a human-powered vehicle, the battery holder comprising:
    a battery attachment portion configured to be attached to a battery unit by a threaded member in a removable manner; and
    the battery attachment portion being formed integrally with a housing of a drive unit as a one-piece member, the drive unit rotatably supporting a crank axle of the human-powered vehicle,
    the housing of the drive unit including a first hole and a second hole to rotatably support the crank axle.

7. The battery holder according to claim 6, further comprising
    at least one guide portion configured to guide the battery unit in a predetermined direction in a case where the battery unit is being attached to or being removed from the battery attachment portion.

8. The battery holder according to claim 7, wherein
    the threaded member includes at least one of a bolt and a nut,
    the battery attachment portion includes at least one of an internal thread portion configured to be joined with the bolt, an external thread portion configured to be joined with the nut, and a through hole configured to allow passage of part of the bolt, and
    the at least one of the internal thread portion, the external thread portion, and the through hole extends in a direction substantially parallel to the predetermined direction.

9. The battery holder according to claim 7, wherein
    the predetermined direction is non-parallel to an axial direction of the crank axle.

10. The battery holder according to claim 9, wherein
    the predetermined direction is a direction extending substantially orthogonal to a direction parallel to the axial direction of the crank axle.

11. The battery holder according to claim 7, wherein
    the battery attachment portion is configured so that the battery unit is attached with a longitudinal direction of the battery unit being substantially parallel to the predetermined direction.

12. The battery holder according to claim 7, wherein
    the predetermined direction is substantially parallel to a direction in which a downtube or a seat tube of the frame extends.

13. The battery holder according to claim 7, further comprising
    a restriction configured to restrict movement of the battery unit in a first direction of the predetermined direction in which the battery unit is being removed from the battery attachment portion.

14. The battery holder according to claim 13, wherein
    the restriction is configured to be movable between a first position where the restriction restricts movement of the battery unit and a second position where the restriction does not restrict movement of the battery unit.

15. The battery holder according to claim 14, further comprising
    an operating portion configured to operate the restriction, wherein the operating portion includes a lever member rotated about a predetermined rotational axis.

16. The battery holder according to claim 15, wherein
the operating portion is provided at a position where at least part of the operating portion is covered by an electric wiring unit that is electrically connected to the battery unit.

17. The battery holder according to claim 16, wherein
the predetermined rotational axis extends substantially perpendicular to the predetermined direction.

18. The battery holder according to claim 14, further comprising
a biasing portion that biases the restriction from the second position toward the first position.

19. The battery holder according to claim 13, wherein
the battery attachment portion is provided at a downstream side of the restriction in the first direction.

20. The battery holder according to claim 13, wherein
the battery attachment portion is provided at a downstream side of the at least one guide portion in the first direction.

21. The battery holder according to claim 6, wherein
the threaded member includes at least one of a bolt and a nut, and
the battery attachment portion includes at least one of an internal thread portion configured to be joined with the bolt, an external thread portion configured to be joined with the nut, and a through hole configured to allow passage of part of the bolt.

22. The battery holder according to claim 6, wherein
at least part of the battery attachment portion is located downward from the crank axle, the drive unit is connected to the frame, and each wheel of the human-powered vehicle is in contact with level ground.

* * * * *